(12) United States Patent
Itami et al.

(10) Patent No.: US 8,169,458 B2
(45) Date of Patent: May 1, 2012

(54) OPTICAL SCANNING DEVICE AND IMAGE FORMING APPARATUS

(75) Inventors: Yukio Itami, Kanagawa (JP); Tomoya Ohsugi, Kanagawa (JP); Magane Aoki, Kanagawa (JP); Tomohiro Nakajima, Kanagawa (JP); Yoshinori Hayashi, Kanagawa (JP); Naoki Miyatake, Kanagawa (JP); Kensuke Masuda, Tokyo (JP); Naoto Watanabe, Kanagawa (JP); Satoshi Tsuchiya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 328 days.

(21) Appl. No.: 12/574,748

(22) Filed: Oct. 7, 2009

(65) Prior Publication Data
US 2010/0091083 A1   Apr. 15, 2010

(30) Foreign Application Priority Data

Oct. 10, 2008  (JP) ................................ 2008-264495
Feb. 4, 2009   (JP) ................................ 2009-024060

(51) Int. Cl.
   *B41J 2/435*   (2006.01)
   *G02B 26/10*   (2006.01)
(52) U.S. Cl. ........................ 347/243; 347/261
(58) Field of Classification Search .................. 347/241, 347/243, 242, 256, 257, 261; 399/92, 93, 399/98; 359/216.1, 217.1
See application file for complete search history.

(56) References Cited

U.S. PATENT DOCUMENTS

| | | | |
|---|---|---|---|
| 5,046,797 A * | 9/1991 | Kurisu et al. | 359/217.1 |
| 7,126,737 B2 | 10/2006 | Atsuumi et al. | |
| 7,420,723 B2 | 9/2008 | Itami et al. | |
| 7,436,565 B2 * | 10/2008 | Tahk | 359/216.1 |
| 7,586,660 B2 | 9/2009 | Itami | |
| 2006/0061847 A1 | 3/2006 | Itami | |
| 2006/0187513 A1 | 8/2006 | Ohsugi | |
| 2006/0284968 A1 | 12/2006 | Hayashi et al. | |
| 2007/0058235 A1 * | 3/2007 | Nagase | 359/216 |
| 2007/0146852 A1 | 6/2007 | Itami | |
| 2007/0216966 A1 | 9/2007 | Ohsugi | |
| 2008/0025750 A1 * | 1/2008 | Yamazaki et al. | 399/92 |
| 2008/0174843 A1 | 7/2008 | Masuda et al. | |
| 2008/0204539 A1 | 8/2008 | Itami et al. | |
| 2008/0212999 A1 | 9/2008 | Masuda et al. | |
| 2008/0219601 A1 | 9/2008 | Arai et al. | |
| 2008/0239432 A1 | 10/2008 | Itami | |
| 2009/0225148 A1 | 9/2009 | Itami et al. | |

FOREIGN PATENT DOCUMENTS

JP   2008-33135 A   2/2008
JP   2010-113329   * 5/2010

* cited by examiner

*Primary Examiner* — Huan Tran
(74) *Attorney, Agent, or Firm* — Dickstein Shapiro LLP

(57) ABSTRACT

An optical scanning device includes an optical housing in which a polygon mirror that is rotated by a motor is accommodated and an air inlet that includes a filter. An airflow guiding member is arranged at a position opposite to a surface of the polygon mirror on the air inlet side. An air inducing path is provided, which includes a first flowing path and a second flowing path. The first flowing path includes a first end linked to the air inlet and a second end arranged close to a mirror surface of the polygon mirror. The second flowing path is formed with a surface of the airflow guiding member on an opposite side of the air inlet and a top surface of the polygon mirror.

20 Claims, 15 Drawing Sheets

TOWARD FIXING DEVICE

OPTICAL SCANNING DEVICE AND IMAGE FORMING APPARATUS

CROSS-REFERENCE TO RELATED APPLICATIONS

The present application claims priority to and incorporates by reference the entire contents of Japanese Patent Application No. 2008-264495 filed in Japan on Oct. 10, 2008 and Japanese Patent Application No. 2009-024060 filed in Japan on Feb. 4, 2009. The present application further incorporates by reference the entire contents of Japanese Patent Application No. 2008-226358 filed in Japan on Sep. 3, 2008.

BACKGROUND OF THE INVENTION

1. Field of the Invention

The present invention relates to a digital optical writing system, and more particularly, to an optical scanning device for use in a digital output device, such as a printer and a facsimile machine, and image forming apparatus that uses the optical scanning device.

2. Description of the Related Art

In an optical scanning device for use in an image forming apparatus, temperature generally increases at and around an optical deflector under application of heat produced by a rotating polygon mirror. This causes an optical housing to have uneven temperature distribution (temperature difference). The temperature rise and the uneven temperature distribution in the optical housing can cause an optical component, such as a mirror, to be deformed or move a position where the optical component is fixed, thereby causing beam spot displacement on a photosensitive member and degradation in image quality to occur. The larger the temperature rise, the larger the beam spot displacement and the degree of the degradation in image quality. To this end, a structure for providing air cooling by using a fan that produces airflow and a duct that is arranged around the optical housing has been disclosed. However, this conventional structure is disadvantageous in requiring additional space for the duct around the optical housing, which inhibits compact construction of an image forming apparatus. The conventional structure is also disadvantageous in being less environmentally friendly because driving the fan increases power consumption.

The conventional structure is also disadvantageous in that because cooling is provided from the outside of the optical housing that incorporates heat sources, a large motor fan is required to obtain sufficient cooling effect. In particular, when the optical housing is made of resin of which thermal conductivity is typically low, heat is conducted to the entire optical housing before the heat reaches the outer surface of the optical housing. The conducted heat causes the optical housing to be deformed, resulting in beam spot displacement on the photosensitive member and degradation image quality.

FIG. 10 and FIG. 11 are schematic cross-sectional views of examples of the conventional structure for illustration of the disadvantages. Each of the example structures disclosed in Japanese Patent Application Laid-open No. H1-19601 (FIG. 11) and Japanese Patent No. 3192271 (FIG. 10) includes a filtered air inlet (242, 131*d*) that is arranged above a polygon mirror (214, 127) and an air outlet (244, 121*b*) that is arranged below the polygon mirror in an optical housing. However, with the conventional structures, because airflow circulates over the polygon mirror as depicted in FIG. 10 or FIG. 11, an amount of intake air is insufficient, and the pressure does not build up in the optical housing sufficiently. Accordingly, air exhaustion and cooling effect resulting therefrom have been insufficient. The conventional structures have also been disadvantageous in that fine dusts flown into the optical housing through a gap between a housing cover and the optical housing and gaseous contaminants that have passed through the filter are conveyed by the circulation flow over the polygon mirror and stick to the polygon mirror, thereby causing mirror surfaces of the polygon mirror to be hazed.

FIG. 28 is a schematic top view of an optical scanning device of another conventional structure.

The conventional optical scanning device includes a polygon mirror 622 that is substantially hermetically sealed in a polygon mirror chamber. The optical scanning device includes first reflectors 626*a* arranged toward a fixing device and second reflectors 626*b* arranged away from the fixing device. The temperatures of the first reflectors 626*a* and the second reflectors 626*b* differ from each other by approximately 6 to 7 degrees Celsius while scanning is performed. This temperature deviation causes optical elements and components that support the optical elements to thermally expand nonuniformly, which results in chromatic misregistration.

FIGS. 12 and 13 are schematic diagrams for illustrating hazed portions on mirror surfaces of a polygon mirror.

The mirror surfaces are hazed and/or become dirty as follows. As depicted in FIG. 12, when the polygon mirror rotates to bring a second surface or a third surface of the polygon mirror to a side where a first surface is currently positioned, haze and dirt mainly cover a downstream portion (for example, a right-hand portion of the second surface) of the surface. The reason why the downstream portion mainly becomes hazed and dirty is assumed as follows. When the polygon mirror rotates, air is pushed radially outward at a portion that includes an edge where air passes around (for example, a left-hand portion of the first surface) (hereinafter, "air-leaving portion") of a mirror surfaces. As a result, as depicted in FIG. 13, a negative pressure develops over a portion on a mirror surface (the right-hand portion of the second surface) immediately downstream of the air-leaving portion. Dusts and gaseous contaminants contained in air supplied from above and below the polygon mirror are sucked to the negative-pressure portion and solidified to stick onto the polygon mirror surface. This mechanism will be described in detail below.

It has experimentally been confirmed that the polygon mirror is hazed and becomes dirty such that, as depicted in FIG. 12, when the polygon mirror rotates to bring the second or third surface to the side where the first surface is currently positioned, haze and dirt mainly cover a downstream portion (for example, the right-hand portion of the second surface) of an air-leaving portion (for example, the left-hand portion of the first surface).

More specifically, an airflow-analyzing computer simulation has been performed on airflows over the polygon mirror to track the cause of the haze and dirt on the polygon mirror surfaces. The computer simulation has revealed that when the polygon mirror rotates, air is pushed radially outward at the air-leaving portion (for example, the left-hand portion of the first surface). As a result, a negative pressure develops over the portion (the right-hand portion of the second surface) immediately downstream of the air-leaving portion, and air is supplied from above and below the polygon mirror to the negative-pressure portion.

Hence, it is estimated based on result of the simulation that the haze and dirt are mainly caused through the following process. Dusts and gaseous contaminants contained in the air above and below the polygon mirror are sucked to the negative-pressure portion, attached onto the reflector surface, and solidified (sublimation from solid to gaseous solid), thereby sticking to the mirror surface.

An example of another conventional structure is disclosed in Japanese Patent Application Laid-open No. 2006-221033. This conventional structure employs a suction air duct to prevent noise produced by a rotating polygon mirror from coming out of an optical housing. However, even when such a suction air duct is provided, wind noise produced by the rotating polygon mirror comes out of the optical housing because sufficient attenuation of the wind noise cannot be achieved only by the suction air duct.

In the structure disclosed in Japanese Patent Application Laid-open No. 2006-221033, a fan serving as a cooling unit is arranged above a rotary polygon mirror. However, because a load placed on a polygon-mirror drive motor is increased by a load required to drive the fan, an amount of electric current supplied to the drive motor increases, which increases power consumption and hence an amount of heat produced by the drive motor. In other words, when a fan is additionally provided in an optical scanning device, power consumption by the optical scanning device increases as compared with an optical scanning device without a fan, disadvantageously making the optical scanning device with the fan less environmentally friendly.

Although a field of application is different from that of optical scanning devices, another technique directed to noise reduction is disclosed in, for example, in Japanese Patent Application Laid-open No. H11-287544. This technique is directed to an apparatus that uses a suction fan and an exhaust fan having the same sound power level and acoustic frequency of noise and achieves noise reduction by causing acoustic transmission distances for the fans to differ from each other by a half-wave length of the acoustic frequency.

It is an object of the present invention to provide an optical scanning device in which air whose temperature is lower than that inside an optical housing is supplied to space around a polygon mirror, thereby increasing cooling effect and preventing mirror surfaces of the polygon mirror from being hazed and becoming dirty.

Addition of an air inlet to the optical scanning device brings about an increase in noise power level. To this end, a suction air duct that can effectively reduce noise is arranged at the air inlet. The suction air duct prevents wind noise produced by a rotating polygon mirror and noise produced by a driving motor from directly coming out of the optical scanning device.

It is another object of the present invention to prevent heat leakage to a light source and a scanning lens, thereby reducing beam spot displacement that can occur when a fixed position of an optical component is changed by heat.

SUMMARY OF THE INVENTION

It is an object of the present invention to at least partially solve the problems in the conventional technology.

According to one aspect of the present invention, there is provided an optical scanning device that includes an optical housing in which a polygon mirror that is rotated by a driving force from a motor is accommodated and an air inlet that includes a filter. The optical scanning device further includes: an airflow guiding member that is arranged at a position opposite to a surface of the polygon mirror on the air inlet side, for preventing an air circulation around the polygon mirror; and an air inducing path that includes a first flowing path including a first end that is linked to the air inlet and a second end that is arranged close to a mirror surface of the polygon mirror, and a second flowing path that is formed with a surface of the airflow guiding member on an opposite side of the air inlet and a top surface of the polygon mirror.

Furthermore, according to another aspect of the present invention, there is provided an image forming apparatus that forms an image on a recording medium by forming a latent image on a photosensitive medium by an optical scanning using an optical scanning device and developing the latent image with toner. The optical scanning device includes an optical housing in which a polygon mirror that is rotated by a driving force from a motor is accommodated, an air inlet that includes a filter, an airflow guiding member that is arranged at a position opposite to a surface of the polygon mirror on the air inlet side, for preventing an air circulation around the polygon mirror, and an air inducing path that includes a first flowing path including a first end that is linked to the air inlet and a second end that is arranged close to a mirror surface of the polygon mirror and a second flowing path that is formed with a surface of the airflow guiding member on an opposite side of the air inlet and a top surface of the polygon mirror.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

Figure 1:
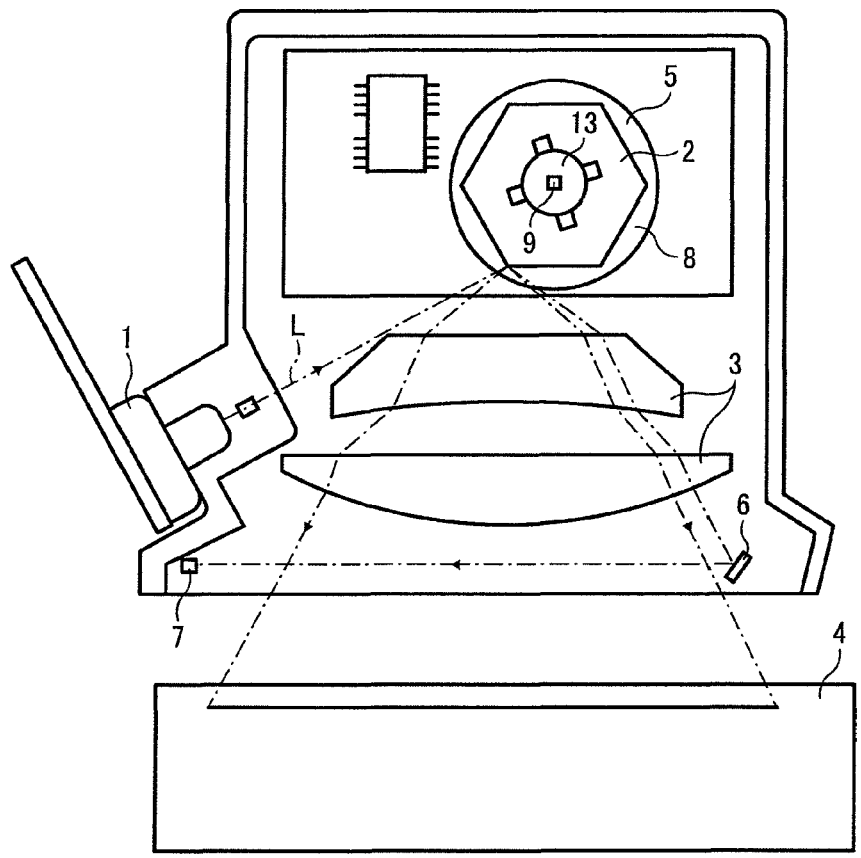
FIG. 1 is a schematic diagram of an optical scanning device according to a first embodiment of the present invention.

FIG. 1 is a schematic diagram of an optical scanning device according to a first embodiment of the present invention.

The optical scanning device includes a laser emitter 1, a polygon mirror 2, a set of condensing lenses 3, a photosensitive drum 4, a motor 5, a reflector 6, a detector 7, and an optical housing 14. The laser emitter 1, which is a light source device, emits a laser beam L.

Figure 2:
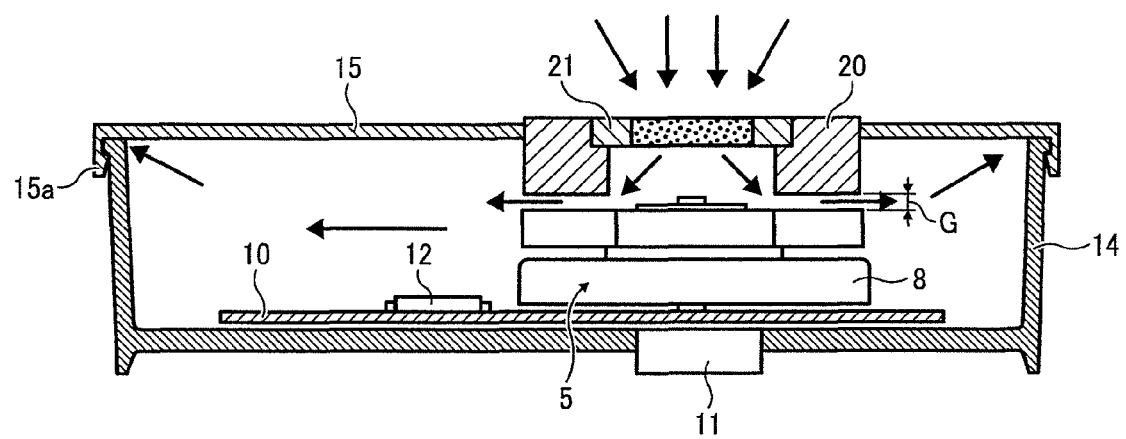
FIG. 2 is a schematic cross-sectional view of an optical housing in the optical scanning device depicted in FIG. 1.

FIG. 2 is a schematic cross-sectional view of the optical housing 14.

The laser beam L emitted from the laser emitter 1 is reflected from the polygon mirror 2 and travels through the condensing lenses 3 to be focused on the photosensitive drum 4. At the same time, the polygon mirror 2 is rotated by the motor 5 so that a portion of the laser beam L is reflected from the reflector 6 to enter the detector 7. The detector 7 outputs a detection signal used to determine write timing for the laser beam L on a scan-line-by-scan-line basis.

The motor 5 includes a rotor 8, a rotation shaft 9, a motor circuit board 10, and a motor casing 11. A drive integrated circuit (IC) 12 is arranged on the motor circuit board 10. The polygon mirror 2 is fixed to the rotor 8 by a retaining spring 13.

The motor 5 is housed in the optical housing 14. A lid 15 is fixed to the optical housing 14 with a fixing rib 15a to prevent dusts or the like from entering inside the optical housing 14 from the outside.

A substantially cylindrical airflow guiding member 20 configured to induce outside air into the optical housing 14 and to prevent induced air from circulating over mirror surfaces of the polygon mirror 2 is arranged immediately above the polygon mirror 2. The airflow guiding member 20 forms a substantially cylindrical air inducing path and includes a first surface arranged toward an outside-air inlet and a second surface positioned near the polygon mirror 2 to face the polygon mirror 2. The first surface and the second surfaces are opposite surfaces of the airflow guiding member 20. The airflow guiding member 20 is fixed to the lid 15 at a portion near the first surface. The second surface that faces the polygon mirror 2 is a substantially annulus flat surface.

Space inside the airflow guiding member 20 is referred to as a first flowing path while a flowing path formed between the airflow guiding member 20 and the polygon mirror 2 is referred to as a second flowing path.

Figure 3A:
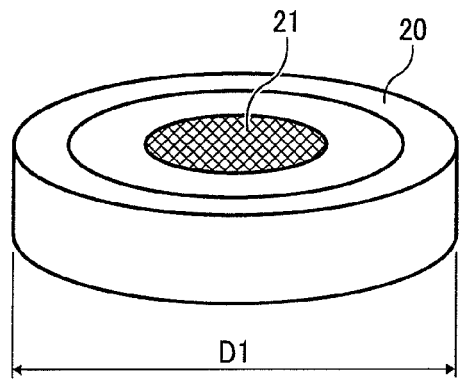
FIGS. 3A and 3B are schematic perspective views for illustrating a relationship in view of size between an airflow guiding member and a polygon mirror depicted in FIG. 2.
Figure 3B:
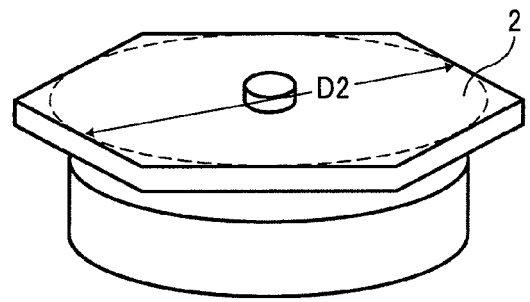

FIGS. 3A and 3B are schematic perspective views for illustrating a relationship in view of size between the airflow guiding member 20 and the polygon mirror 2.

As depicted in FIG. 3A, an outer diameter D1 of at least the bottom surface, or the surface that defines the second flowing path, of the airflow guiding member 20 is larger than a diameter D2 of the incircle of the polygon of the polygon mirror 2.

An activated carbon filter 21 is arranged on the airflow guiding member 20.

Figure 4:
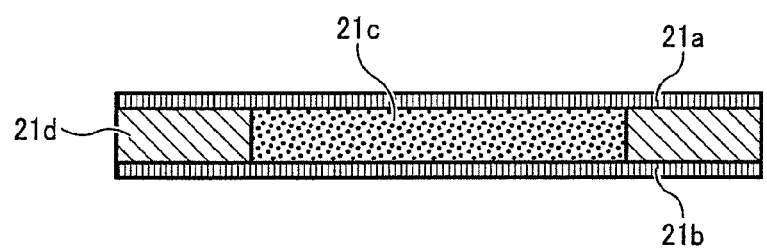
FIG. 4 is an enlarged cross-sectional view for illustrating the structure of a filter depicted in FIG. 2.

FIG. 4 is an enlarged cross-sectional view for illustrating the structure of the filter 21.

The filter 21 is formed by sandwiching activated carbon 21c between sheet-type electrostatic filters 21a and 21b. The activated carbon 21c and the sheet-type electrostatic filters 21a and 21b are retained by a structural member 21d.

The filter 21 is attached to the airflow guiding member 20 with double-faced tape, a screw, or the like in a replaceable manner. To facilitate replacement, the filter 21 can be resiliently mounted by using a spring or the like.

The arrows in FIG. 2 schematically indicate airflows produced by rotation of the polygon mirror 2. When the polygon mirror 2 is rotated, air is pushed out by the mirror surfaces of the polygon mirror 2, thereby forming a negative pressure. Accordingly, air flows into the optical housing 14 from above and below the polygon mirror 2 under suction of the negative pressure. The negative pressure is sequentially transmitted from above the polygon mirror 2 to the inside the airflow guiding member 20, or the air inducing path. Hence, outside air is induced into the optical housing 14. At this time, the outside air is caused to pass through the activated carbon filter 21 before entering the air inducing path. Because dusts and gaseous contaminants are adsorbed by the filter 21, filtered air is supplied to space around (hereinafter, "periphery") the polygon mirror 2. Dusts are mainly attracted by the sheet-type electrostatic filters 21a and 21b while gaseous contaminants are mainly adsorbed by the activated carbon 21c.

The airflow guiding member 20 prevents air from circulating over the polygon mirror 2 and supplies filtered air to the periphery of the polygon mirror 2 so that an air curtain is formed with airflow, whereby the mirror surfaces of the polygon mirror 2 are prevented from being hazed and becoming dirty. The outer diameter D1 of the airflow guiding member 20 is preferably equal to or larger than the diameter D2 of the incircle of the polygon of the polygon mirror 2 to enhance the effect of inducing outside air and prevent air from circulating over the polygon mirror 2. The outer diameter D1 is further preferably larger than the diameter D2 of the circumcircle of the polygon formed with vertices of a polygon (which is a hexagon when the polygon mirror 2 has six mirror surfaces) of the polygon mirror 2.

A gap G, which defines the opening area of the second flowing path, between the second surface of the airflow guiding member 20 and the polygon mirror 2 is preferably 3 to 5 millimeters or smaller. The smaller the gap G, the larger the effect of inducing outside air; however, the gap G is preferably set to an appropriate length in a range from approximately 1 to 5 millimeters so that loud noise is not produced by rotation of the polygon mirror 2.

An exhaust port is not provided in the optical housing 14; however, the optical housing 14 is not hermetically sealed. Accordingly, when the pressure inside the optical housing 14 is increased by the induced outside air, air flows out of the optical housing 14 through a clearance at a juncture between the optical housing 14 and the lid 15. Specifically, the air inside the optical housing 14 is heated under application of heat from a motor unit and a bearing produced by rotation of the polygon mirror 2 and frictional heat between the air and the polygon mirror 2 itself and pushed out of the optical housing 14 through the clearance. This in turn induces outside air whose temperature is lower than that of the air inside the optical housing 14 to the periphery of the polygon mirror 2. This induction of the outside air not only increases the effect of cooling the polygon mirror 2, which is the heat source, but also reduces an amount of heat transmitted to optical elements, such as the condensing lenses 3, arranged in the optical housing 14. As a result, an amount of temperature deviation in the optical housing 14 and the optical elements is reduced.

By virtue of the structure, operation, and effects described above, a temperature rise at and near the polygon mirror 2 is suppressed and an amount of temperature deviation (temperature difference) in the optical housing 14 is reduced, whereby beam spot displacement on the photosensitive drum 4 and the degree of degradation in image quality are reduced. Because outside air is caused to pass through the activated carbon filter 21 that remove dusts and gaseous contaminants from the outside air, filtered air is supplied to the periphery of the polygon mirror 2 without fail, whereby the mirror surfaces of the polygon mirror 2 are prevented from being hazed and becoming dirty. As a result, reflectivity of the mirror surfaces of the polygon mirror 2 is maintained uniform without decrease, making it possible to provide an image forming apparatus capable of forming a relatively high-quality image without degradation in image quality. Because it is not necessary to arrange a duct outside of the optical housing and to provide air cooling with airflow produced a fan, the optical housing and its surrounding elements can be constructed compact and an increase in power consumption for the fan can be avoided.

Figure 5A:
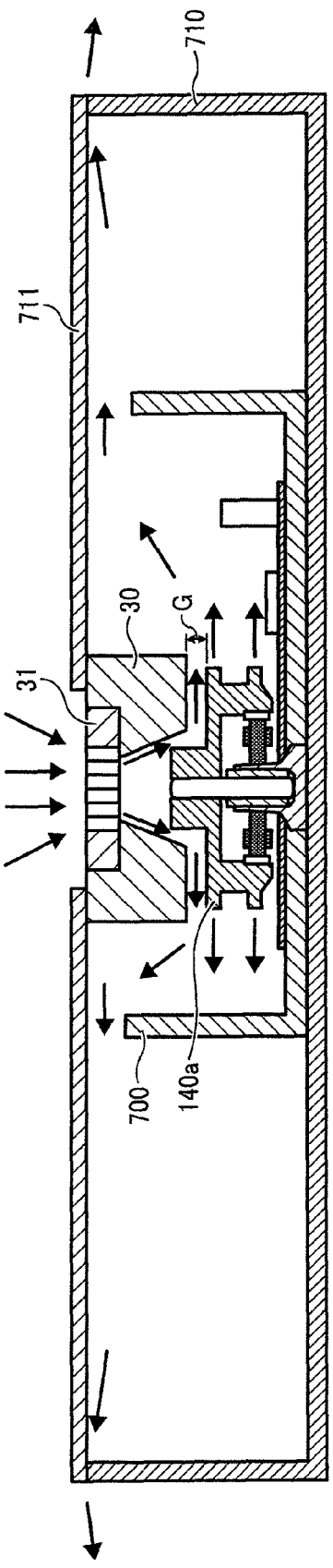
FIGS. 5A and 5B are schematic cross-sectional views for illustrating optical housings according to a second embodiment of the present invention.
Figure 5B:
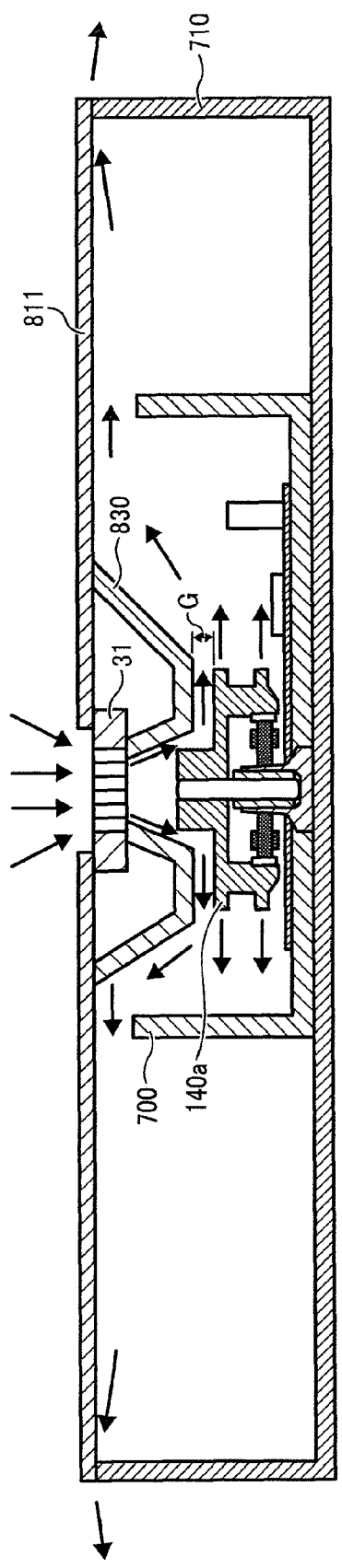

FIGS. 5A and 5B are schematic cross-sectional views of an optical scanning device according to a second embodiment of the present invention. FIG. 5A is a schematic view for illustrating a conical flowing path in an optical housing of the optical scanning device. FIG. 5B is a schematic view of a modification of the conical flowing path.

Figure 6A:
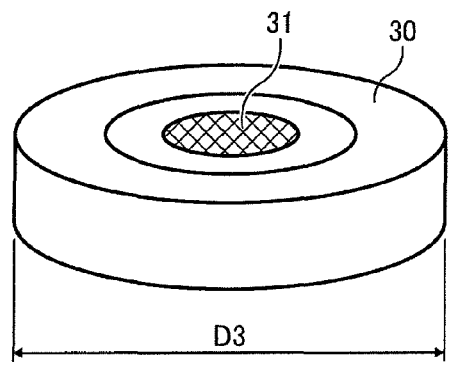
FIGS. 6A and 6B are schematic perspective views for illustrating a relationship in view of size between an airflow guiding member and a polygon mirror depicted in FIG. 5A.
Figure 6B:
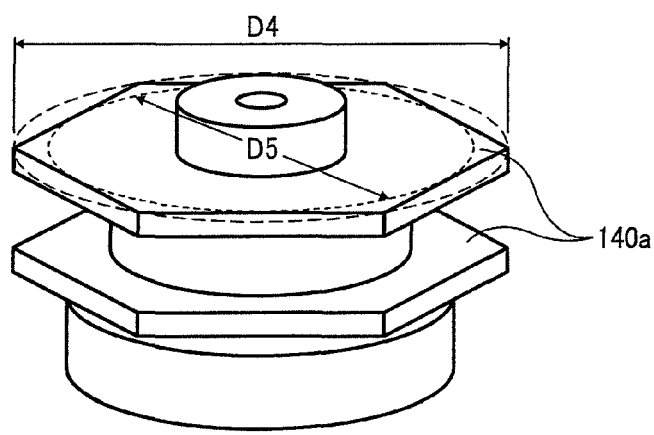

FIGS. 6A and 6B are schematic perspective views for illustrating a relationship in view of size between an airflow guiding member 30 and polygon mirrors 140a depicted in FIG. 5A.

The polygon mirrors 140a are housed in a core casing 700. The core casing is housed in an outer casing 710 and attached thereto. A polygon scanner 140 includes the polygon mirrors 140a arranged in two layers. A lid 711 is fixed to the outer casing 710 to prevent dusts or the like from entering inside the optical housing 14 from the outside. A reflector, an elongated lens, and the like are omitted from FIGS. 5A to 6B.

As depicted in FIG. 5A, the airflow guiding member 30 is arranged immediately above the polygon scanner 140. The airflow guiding member 30 is configured to induce outside air into the core casing 700 and to prevent the induced air from circulating over mirror surfaces of the polygon mirrors 140a. The airflow guiding member 30 forms an air inducing path and includes a first surface arranged toward an outside-air inlet and a second surface positioned near the polygon scanner 140 to face the polygon mirrors 140a. The airflow guiding member 30 is fixed to the lid 711 at a position near the first surface. The second surface that faces the polygon scanner 140 is a substantially annulus flat surface. An internal surface of the airflow guiding member 30 defines the first flowing path through which outside air is to be induced. The first flowing path has a substantially conical shape that expands from the side communicating with the outside toward the polygon scanner 140. As depicted in FIGS. 6A and 6B, an outer diameter D3 of the airflow guiding member 30 is larger than a diameter D4 of the circumcircle of the polygon of the polygon scanner 140. A filter 31 is arranged on the airflow guiding member 30. D5 is the diameter of the incircle of the polygon of the polygon scanner 140.

As depicted in FIG. 5B, an airflow guiding member 830 is formed by, for example, processing a planer member. A portion of the airflow guiding member 830 that is within the range of the polygon scanner 140 in top view has a conical shape that expands from the side of the first surface to the side of the second surface as in the airflow guiding member 30. An outer diameter D3' (not shown) of an annulus bottom surface of the airflow guiding member 830 is larger than the diameter D4 of the circumcircle of the polygon of the polygon scanner 140 as in the airflow guiding member 30.

A portion of the airflow guiding member 830 out of the range of the polygon scanner 140 in top view extends to a lid 811 to form an upwardly inclined surface. A flowing path that guides air to flow away from the polygon scanner 140 is formed in this manner, whereby air that flows out of the gap G is prevented from circulating. This flowing path is referred to as a third flowing path for illustration.

Figure 7:
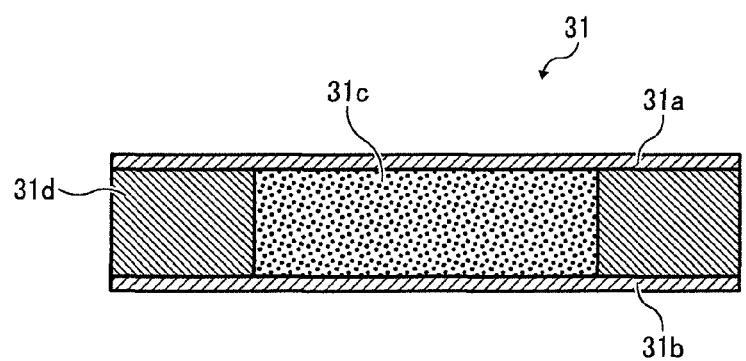
FIG. 7 is an enlarged cross-sectional view for illustrating the structure of a filter depicted in FIGS. 5A and 5B.

FIG. 7 is an enlarged cross-sectional view for explaining the structure of the filter 31.

The filter 31 is formed by sandwiching an activated carbon filter 31c between sheet-type electrostatic filters 31a and 31b. The activated carbon filter 31c and the sheet-type electrostatic filters 31a and 31b are retained by a structural member 31d.

Figure 8:
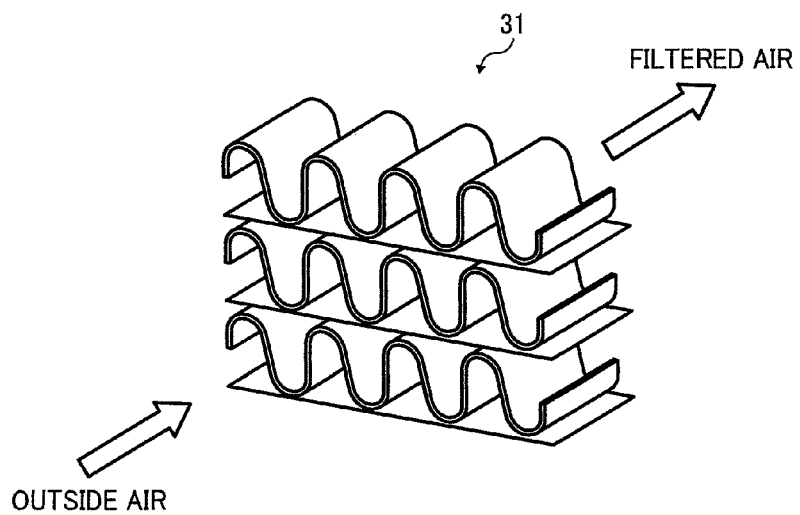
FIG. 8 is a schematic enlarged cross-sectional view of laminated carbon paper for use in the filter depicted in FIG. 7.

FIG. 8 is a schematic enlarged cross-sectional view of laminated carbon paper for use in the filter 31.

Examples of the activated carbon filter 31c include filters, such as CHEMIFY (registered trade mark) series filters manufactured by TOYOBO Co., Ltd., that use activated carbon fiber as adsorbent and combined filters of activated carbon sheets that remove gaseous chemical substance and electret air filters that remove dusts.

As depicted in FIG. 8, activated carbon paper can be laminated to single corrugated fiberboard so as to have a honeycomb structure. Because a filter formed of the activated carbon paper in honeycomb structure features small pressure loss, such a filter is appropriate for a relatively small polygon mirror that produces airflow of a relatively small airflow rate.

The filter 31 is attached to the airflow guiding member 20 with double-faced tape, a screw, or the like in a replaceable manner. To facilitate replacement, the filter 31 can be resiliently mounted by using a spring or the like.

The arrows in FIG. 5 schematically indicate airflows produced by rotation of the polygon scanner 140. When the polygon scanner 140 is rotated, air is pushed out by the mirror surfaces of the polygon scanner 140, thereby forming a negative pressure. Accordingly, air flows into the optical housing from above and below the polygon scanner 140 under suction of the negative pressure. The negative pressure is sequentially transmitted from above the polygon scanner 140 to the inside of the airflow guiding member 30, thereby inducing outside air to the inside of the outer casing 710, which is an optical housing. At this time, because the outside air is caused to pass through the sheet-type electrostatic filters 31a and 31b and the activated carbon filter 31c that adsorbs dusts and gaseous contaminants before the outside air is induced into the optical housing, clean, filtered air is supplied to the periphery of the polygon scanner 140. Because the outer diameter D3 of the airflow guiding member 30 is larger than the diameter D4 of the circumcircle of the polygon of the polygon scanner 140, air is prevented from circulating over the polygon scanner 140. As a result, an air curtain is formed by airflow produced by the filtered air that is supplied to the periphery of the polygon scanner 140. The air curtain prevents the mirror surfaces of the polygon scanner 140 from being hazed and becoming dirty. By setting the outer diameter D3 of the airflow guiding member 30 to be larger than the diameter D5 of the incircle of the polygon of the polygon scanner 140, the effect of preventing haze and contamination on the mirror surfaces of the polygon scanner 140 is obtained. However, this effect can be increased by setting the outer diameter D3 of the airflow guiding member 30 to be larger than the diameter D4 of the circumcircle of the polygon.

The gap G between the second surface of the airflow guiding member 30 and the polygon scanner 140 is preferably 3 to 5 millimeters or smaller. The smaller the gap G, the larger the effect of inducing outside air; however, the gap G is preferably set to an appropriate length in a range from approximately 1 to 5 millimeters so that loud noise is not produced by rotation of the polygon scanner 140.

An exhaust port is not provided in the outer casing 710, which is the optical housing; however, the outer casing 710 is not hermetically sealed. Accordingly, when the pressure inside the outer casing 710 is increased, air flows out of the outer casing 710 through a clearance at a juncture between the outer casing 710 and the lid 711. Specifically, the air inside the optical housing is heated under application of heat from a motor unit and a bearing produced by rotation of the polygon scanner 140 and frictional heat between the air and the polygon scanner 140 itself and pushed out of the optical housing through the clearance. This in turn induces outside air whose temperature is lower than that of the air inside the optical housing to the periphery of the polygon scanner 140. This induction of the outside air not only increases the effect of cooling the polygon scanner 140, which is the heat source, but also reduces an amount of heat transmitted to optical elements, such as the condensing lenses 3, arranged in the optical housing. As a result, an amount of temperature deviation in the optical housing and the optical elements is reduced.

By virtue of the structure, operation, and effects described above, a temperature rise at and near the polygon scanner 140 is suppressed and an amount of temperature deviation (temperature difference) in the optical housing is reduced. Hence, beam spot displacement on the photosensitive drum 4 and the degree of degradation in image quality are reduced. Because outside air is caused to pass through the filter 31 that removes dusts and gaseous contaminants from the outside air, filtered air is normally supplied to the periphery of the polygon scanner 140, and the mirror surfaces of the polygon scanner 140 are prevented from being hazed and becoming dirty. As a result, reflectivity of the mirror surfaces of the polygon scanner 140 is maintained uniform without decrease. This makes it possible to provide an image forming apparatus capable of forming a relatively high-quality image.

Because the first flowing path, through which outside air is induced, has the substantially conical shape that expands from the side of the outside-air inlet toward the polygon scanner 140, turbulence of airflow in the air inducing path is reduced. This makes it possible to prevent fluctuation in rotation speed of an optical deflector and noise production.

Because the filter 31 is configured to be replaceable, it is possible to replace the filter 31 when the filter 31 is clogged by secular change. Hence, it is possible to prevent a decrease in cooling effect that can occur when inducing airflow rate of outside air is lowered due to clogging of the filter 31.

Because it is not necessary to arrange a duct outside the optical housing, the optical housing and its surrounding elements can be constructed compact. Because it is not necessary to provide air cooling with a fan, an increase in power consumption for the fan can also be avoided.

Figure 9:
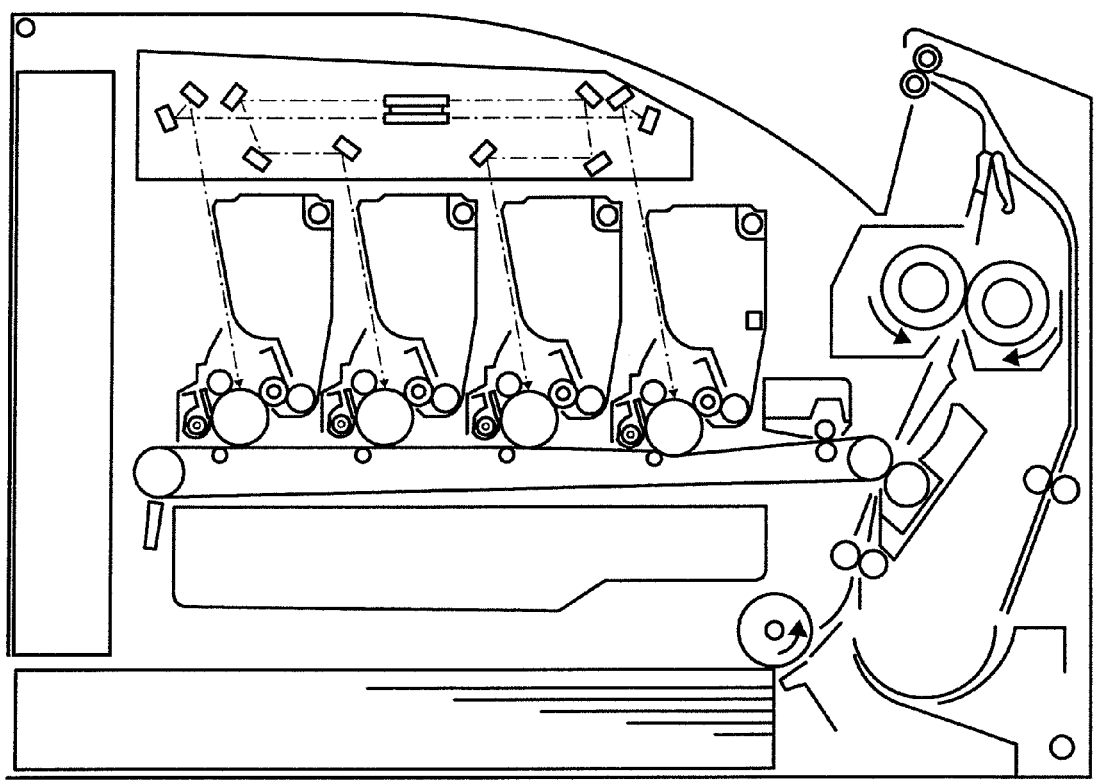
FIG. 9 is a schematic diagram of an image forming apparatus to which an optical scanning device according to an embodiment of the present invention is applicable.
Figure 10:
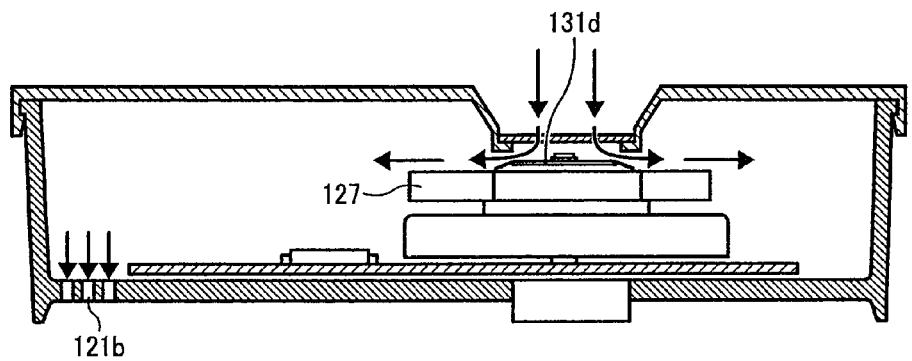
FIGS. 10 and 11 are schematic diagrams for illustrating disadvantages pertaining to conventional technologies.
Figure 11:
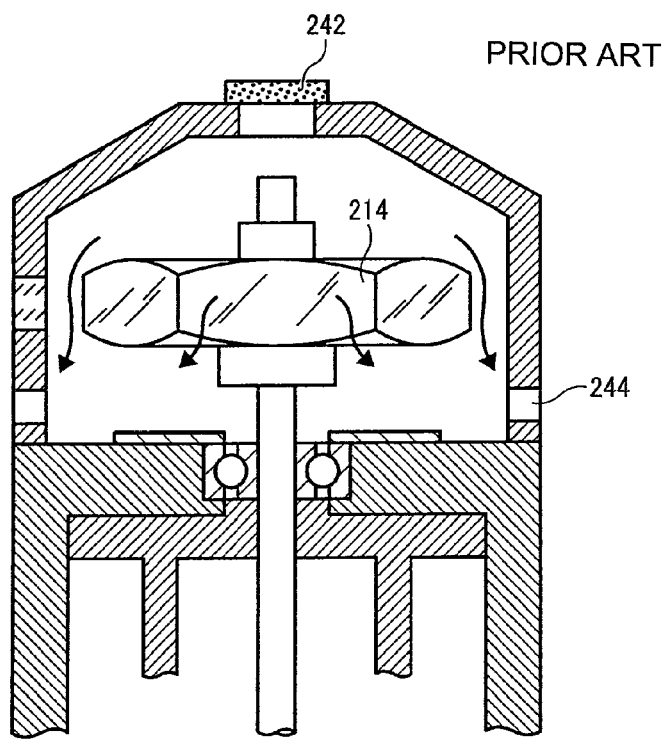
Figure 12:
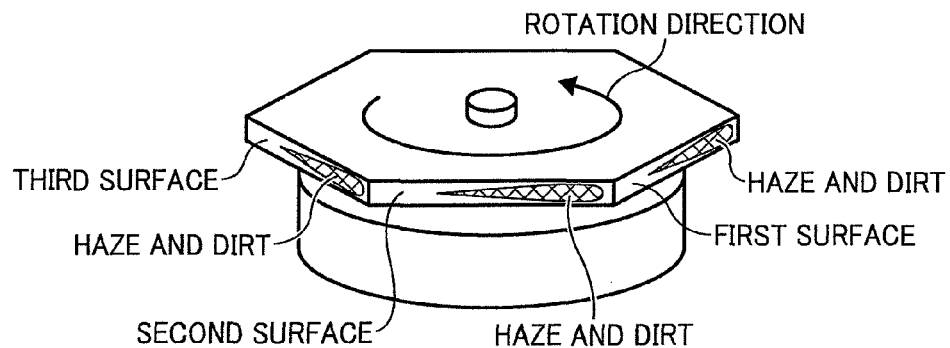
FIGS. 12 and 13 are schematic diagrams for illustrating hazed portions on mirror surfaces of a polygon mirror.
Figure 13:
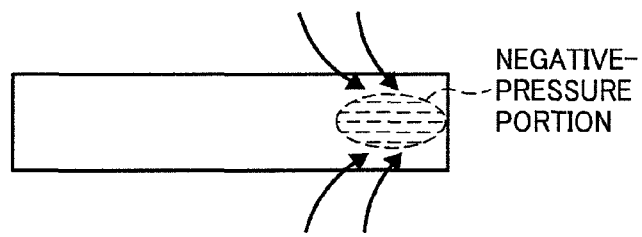

FIG. 9 is a schematic diagram of an image forming apparatus to which an optical scanning device according to an embodiment of the present invention is applicable.

An optical scanning device according to a third embodiment of the present invention applied to the image forming apparatus will be described below.

Although the image forming apparatus differs from conventional image forming apparatuses in the structure of the optical scanning device, major components of the image forming apparatus are basically the same with those of the conventional image forming apparatuses. Hence, descriptions of the image forming apparatus are omitted.

The optical scanning device according to the third embodiment includes polygon mirrors arranged in two layers. As a matter of course, the present invention is applicable to an image forming apparatus that includes an optical scanning device that includes a single-layer polygon mirror as does the optical scanning device according to the first embodiment.

The present invention is applicable to most optical scanning devices and image forming apparatuses that include a polygon mirror. For example, the present invention is applicable to an image forming apparatus that uses an optical scanning device that includes an upper polygon mirror and a lower polygon mirror configured to have a phase difference therebetween.

Because it is not necessary for the image forming apparatus according to the present invention to include a duct arranged around the optical housing, the image forming apparatus can be constructed compact. Because it is not necessary for the image forming apparatus to provide air cooling by using a fan, an increase in power consumption due to the fan is avoided. Because a temperature rise at and near the polygon mirror is suppressed and an amount of temperature deviation (temperature difference) in the optical housing is reduced, beam spot displacement on the photosensitive drum and the degree of degradation in image quality are reduced. Because an air curtain is formed with filtered air, mirror surfaces of the polygon mirror are prevented from being hazed and becoming dirty. Because reflectivity of the mirror surfaces of the polygon mirror is maintained uniform without decrease, it is possible to provide an image forming apparatus capable of forming a relatively high-quality image without degradation in image quality.

Figure 14:
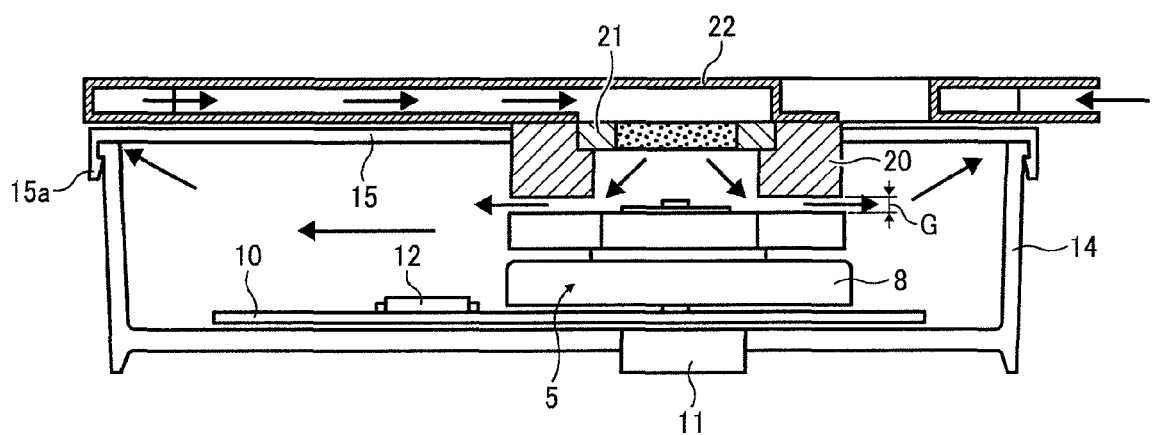
FIG. 14 is a schematic cross-sectional view of an optical housing for explaining a suction duct that is provided to reduce noise.

FIG. 14 is a schematic cross-sectional view of an optical housing 14 for illustrating a suction duct 22 that is provided to reduce noise.

Figure 15:
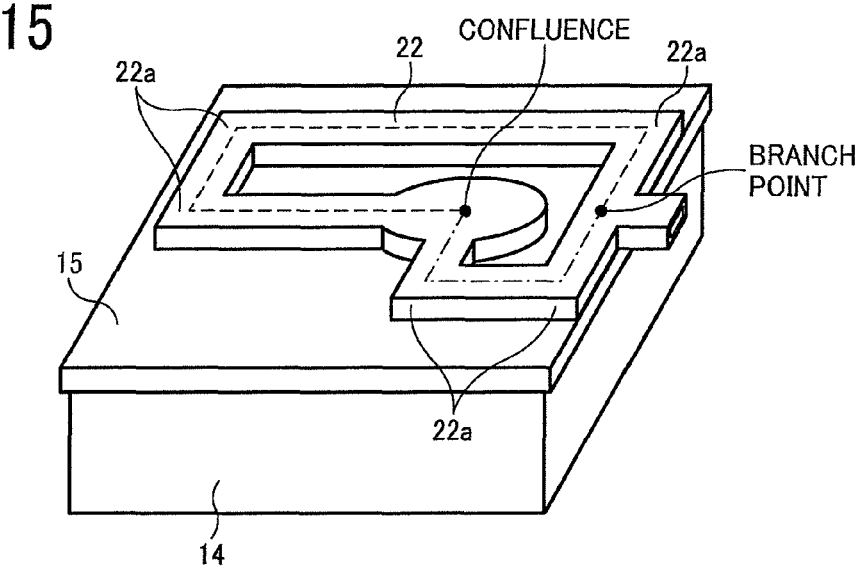
FIG. 15 is a schematic perspective view of the optical housing depicted in FIG. 14.

FIG. 15 is a schematic perspective view of the optical housing 14.

The suction duct 22 extends from the outside-air inlet and lies on the external surface of the optical housing 14. The suction duct 22 is branched into two branch flowing paths of different lengths. The branch flowing paths are branched at a branch point and merged at a confluence. When the polygon mirror 2 attached to the motor 5 is rotated, wind noise and operating noise of the motor 5 are produced. The noise comes out of the optical scanning device and an image forming apparatus in which the optical scanning device is contained; however, it is possible to attenuate the noise by causing sound waves of the noise to pass through the suction duct 22. More specifically, because the suction duct 22 is branched into the two branch flowing paths as described above, a phase difference is developed between a sound wave of the noise that passes through a longer one of the branch flowing paths (hereinafter, "long flowing path") and that passes through the other one of the branch flowing path (hereinafter, "short flowing path"). This causes interference of the sound waves to occur, thereby attenuating the noise. It is preferable that the difference in length between the long flowing path and the short flowing path is substantially a half-wave length of a dominant wavelength of a noise source.

Figure 16A:
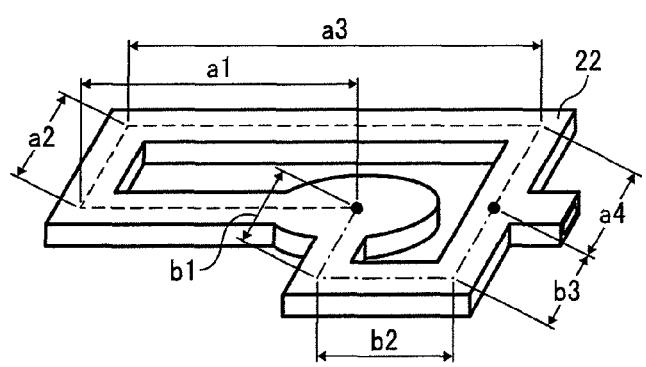
FIGS. 16A and 16B are schematic perspective views for explaining a long flowing path and a short flowing path in the optical housing depicted in FIG. 15.
Figure 16B:
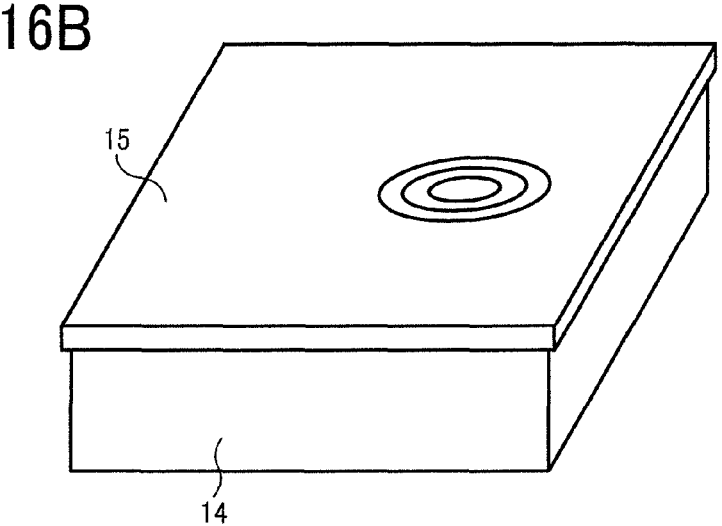

FIGS. 16A and 16B are schematic perspective views for explaining the long flowing path and the short flowing path.

More specifically, the length of the long flowing path and the length of the short flowing path are preferably set to substantially satisfy $$a-b=(c\times 60)/(2\times N\times M) \quad (1)$$

where a [mm] is the length of the long flowing path, b [mm] is the length of the short flowing path (a>b), N is the number of revolutions per minute of the motor 5, M is the number of mirror surfaces of the polygon mirror 2, and c [mm/s] is the velocity of sound traveling through the air.

For example, when the number of revolutions per minute of the motor 5 is 30,000, the number of the mirror surfaces of the polygon mirror 2 is 6, and the velocity of sound traveling through the air is $3.4\times 10^5$ [m/s], a–b is calculated as $$a-b=(3.4\times 10^5\times 60)/(2\times 30{,}000\times 6)\approx 57 \text{ [mm]} \quad (2)$$

It is calculated that the length of the long flowing path is preferably longer than the length of the short flowing path by approximately 57 millimeters. If it is assumed that a2=a4=b1=b3 and a3=a1+b2, a–b=2×a1 is obtained. Hence, a1 is preferably set to 28.5 millimeters, which is in sufficiently an applicable range.

The suction duct 22 can be formed of resin or a steel plate. In a configuration in which the suction duct 22 itself vibrates and generates noise, it is preferable to apply a damping material to a portion of the suction duct 22 or form the suction duct 22 from a laminated damping steel sheet that is formed by laminating a steel plate and a visco-elastic material or the like. The effect of the damping material, the laminated damping steel sheet, or the like causes the noise to be reduced.

Because the acoustic frequency of wind noise produced by a polygon mirror is typically relatively high, it is also preferable to apply a sound-absorbing material formed of a porous material that is excellent in absorbing high-pitched sound to an interior wall of the suction duct 22. While passing through the suction duct 22, sound waves of noise are trapped inside the porous material and diffused, whereby sound energy is converted into vibrational thermal energy. As a result, sound power level of the noise reflected from the porous material is reduced, and hence the noise is reduced.

To remove dusts and gaseous contaminants from induced air, it is also preferable to form at least a portion of the suction duct 22 with an adsorbent (not shown) capable of adsorbing dusts and gaseous contaminants. By arranging an adsorbent on the internal wall of the suction duct 22, dusts and gaseous contaminants can be removed from induced air, thereby reducing an amount of haze on the mirror surfaces of the polygon mirror 2. Examples of the adsorbent to be applied to the interior wall include adsorbent sheets such as an electrostatic filter and an activated carbon filter.

The suction duct 22 preferably includes at least one bent portion 22a. When the suction duct 22 includes the bent portion 22a, not only the sound absorbing effect can be increased because sound waves strike the internal wall of the suction duct 22 at the bent portion 22a, but also contaminants are adsorbed more effectively in the suction duct 22 due to collision of airflows at the bent portion 22a.

By virtue of the structure, operation, and effects described above, a temperature rise at and near the polygon mirror 2 is suppressed and an amount of temperature deviation (temperature difference) in the optical housing 14 is reduced. Hence, beam spot displacement on the photosensitive drum 4 and the degree of degradation in image quality are reduced. Because outside air is caused to pass through the filter 21 for removal of dusts and gaseous contaminants from the outside air so that filtered air is normally supplied to the periphery of the polygon mirror 2, the mirror surfaces of the polygon mirror 2 are prevented from being hazed and becoming dirty. As a result, reflectivity of the mirror surfaces of the polygon mirror 2 is maintained uniform without decrease. This makes it possible to provide an image forming apparatus capable of forming a relatively high-quality image without degradation in image quality. In addition to the effects described above, the following effect is also obtained. Because arranging the suction duct 22 on the top surface of the optical housing 14 reduces noise produced by rotation of the polygon mirror 2 without a fan for air cooling, the optical housing 14 and its surrounding elements can be constructed compact and an increase in power consumption due to an additional fan is avoided.

Figure 17:
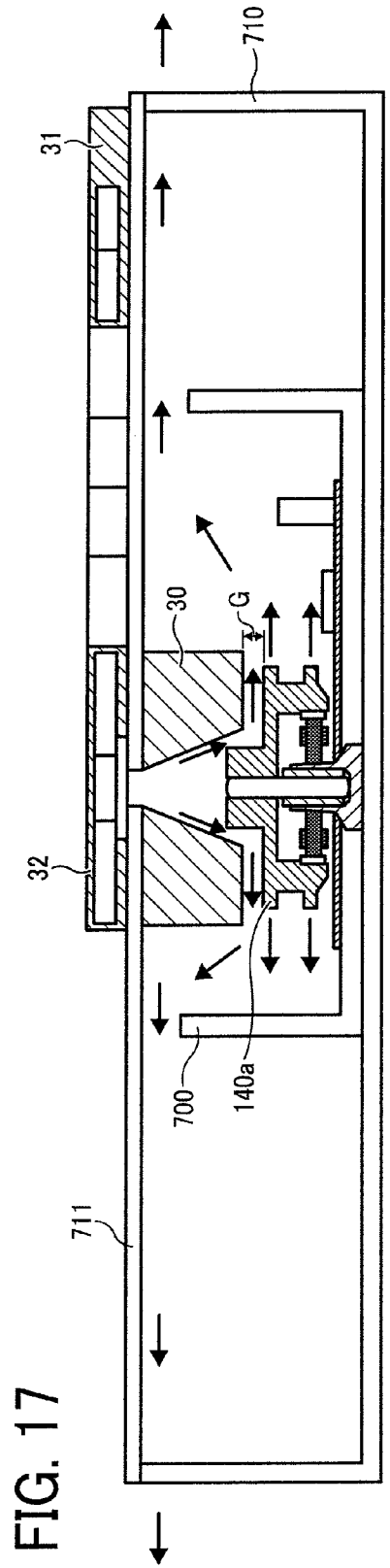
FIG. 17 is a schematic cross-sectional view of an optical scanning device according to a fourth embodiment.

FIG. 17 is a schematic cross-sectional view of an optical scanning device according to a fourth embodiment. The optical scanning device according to the fourth embodiment is a combination of the optical housing according to the second embodiment depicted in FIG. 5A and a suction duct 32 that has a sound-reducing function.

Figure 18:
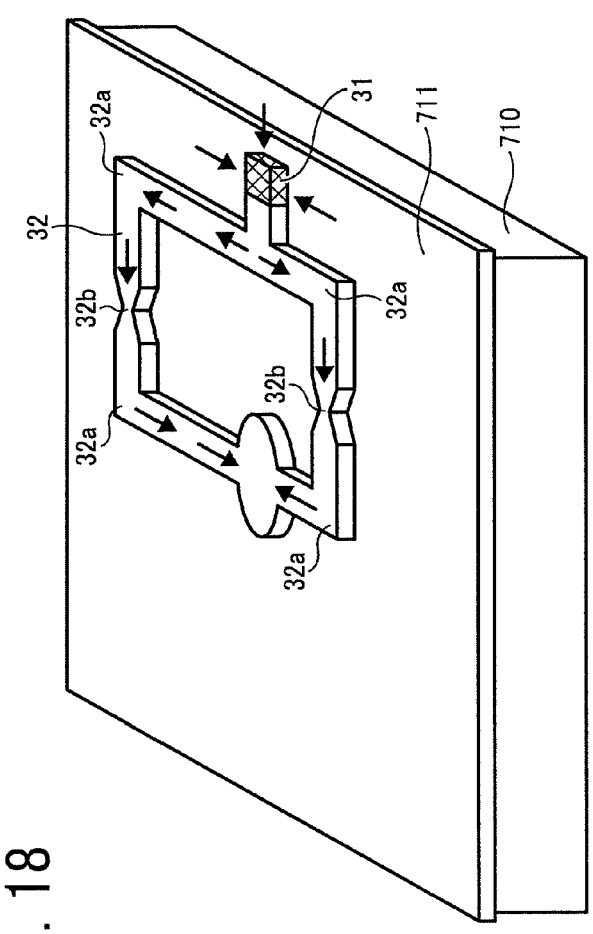
FIG. 18 is a schematic perspective view of a suction duct depicted in FIG. 17.

FIG. 18 is a schematic perspective view of the suction duct 32.

Because the optical housing depicted in FIG. 18 is the same that depicted in FIG. 5A, repeated descriptions are omitted.

As in the suction duct 22, the suction duct 32 extends from the outside-air inlet to lie along the top surface of the optical housing. The suction duct 32 is branched into two branch flowing paths of different lengths (a long flowing path and a short flowing path). The flowing path is branched at a branch point and merged at a confluence. When the polygon scanner 140 is rotated, wind noise and operating noise of the motor 5 are produced. The noise comes out of the optical scanning device and an image forming apparatus that contains the optical scanning device; however, it is possible to attenuate the noise by causing sound waves of the noise to pass through the suction duct 32. More specifically, because a phase difference is developed between a sound wave of the noise that passes through the long flowing path and a sound wave that passes through the short flowing path, the sound waves interfere with each other and attenuate the noise. It is preferable that the difference in length between the long flowing path and the short flowing path is substantially a half-wave length of a dominant wavelength of a noise source. Because the method of setting the difference in length between the long flowing path and the short flowing path is the same with that of the suction duct 22, repeated descriptions are omitted.

The suction duct 32 depicted in FIG. 18 includes the filter 31 at the outside-air inlet.

The filter 31 is formed by sandwiching the activated carbon filter 31c between the sheet-type electrostatic filters 31a and 31b. The activated carbon filter 31c and the sheet-type electrostatic filters 31a and 31b are retained by the structural member 31d. In the optical scanning device, outside air enters the optical housing from the end where the filter 31 is provided. Hence, the first flowing path formed by the airflow guiding member 30 includes the suction duct 32.

In the suction duct 32 depicted in FIG. 18, each of the long flowing path and the short flowing path includes two bent portions 32a.

Each of the long flowing path and the short flowing path includes a tapered portion. The tapered portion not only increases the sound absorbing effect but also causes the flow velocity and the pressure inside the flowing path to change, thereby accelerating solidification and adsorption of gaseous contaminants.

By virtue of the structure, operation, and effects described above, a temperature rise at and near the polygon scanner 140 is suppressed and an amount of temperature deviation (temperature difference) in the optical housing is reduced. Hence, beam spot displacement on the photosensitive drum and the degree of degradation in image quality are reduced. Because outside air is caused to pass through the filter 31 for removal of dusts and gaseous contaminants from the outside air so that filtered air is normally supplied to the periphery of the polygon scanner 140, the mirror surfaces of the polygon scanner 140 are prevented from being hazed and becoming dirty. As a result, reflectivity of the mirror surfaces of the polygon scanner 140 is maintained uniform without decrease. This makes it possible to provide an image forming apparatus capable of forming a relatively high-quality image.

Because the suction duct 32 is arranged on the top surface of the optical housing, the optical housing and its surrounding elements can be constructed compact. Because it is not necessary to provide air cooling by using a fan, an increase in power consumption for the fan can be avoided.

As a matter of course, the optical housing that employs the suction duct of the present invention is applicable to the image forming apparatus depicted in FIG. 9. Applicable ranges, effects, and the like are substantially the same as those described above with reference to FIG. 9, repeated descriptions are omitted.

The structure of a suction duct of the present invention is not limited to that depicted in FIG. 15 or FIG. 17, and can be any structure within the scope of the present invention. As a matter of course, an optical housing of the present invention is not limited to that depicted in FIG. 2 or FIG. 5A, and can be the optical housing depicted in FIG. 5B and a modification of one of them.

Figure 19:
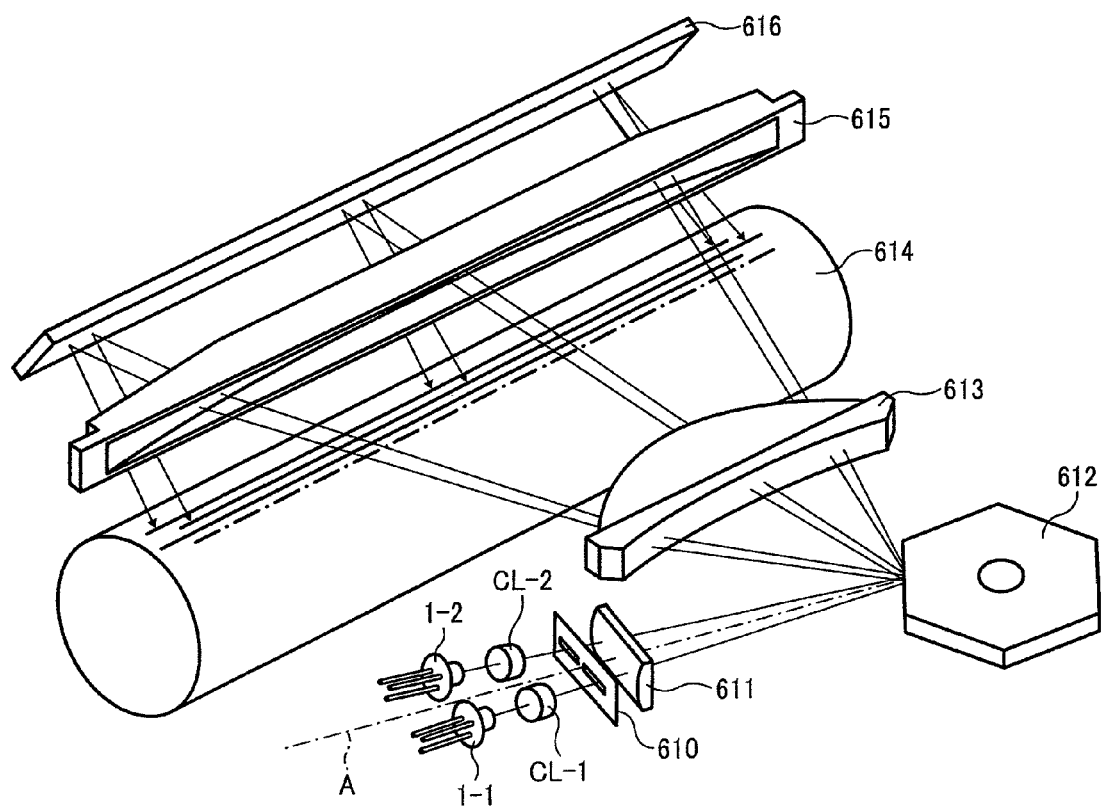
FIG. 19 is a schematic diagram of relevant parts of an image forming apparatus to which an optical scanning device according to an embodiment of the present invention is applicable.

FIG. 19 is a schematic diagram of relevant parts of an image forming apparatus to which an optical scanning device according to an embodiment of the present invention is applicable.

The imaging forming apparatus includes laser diodes (LD) 1-1 and 1-2, an aperture 601, a cylindrical lens 611, a polygon mirror 612, a first scanning lens 613, a photosensitive drum 614, a second scanning lens 615, a reflector 616, and coupling lenses CL-1 and CL-2.

Each of the LDs 1-1 and 1-2 is a multi-beam source capable of emitting a plurality of (in this example, two) light beams. Two light beams emitted from each of the LDs 1-1 and 1-2 are converted into more parallel light by the coupling lenses CL-1 and CL-2 and shaped into a predetermined size by the aperture 601. Thereafter, the light beams are converged only in a sub-scanning direction by the cylindrical lens 611, thereby forming a line image on the polygon mirror 612 at a position near a reflection point. The polygon mirror 612 includes a plurality of deflecting mirror surfaces arranged at regular intervals in a circumferential direction of the polygon mirror 612. The polygon mirror 612 is rotated rapidly by a motor, which is a drive source of the polygon mirror 612, at a constant velocity. Hence, the rotating polygon mirror 612 deflects the light beams at substantially a constant angular velocity. The light beams, which are four light beams in total, deflected by the polygon mirror 612 pass through the first scanning lens 613 and the second scanning lens 615, and are then reflected by the reflector 616 to strike the surface of the photosensitive drum 614. The first scanning lens 613 and the second scanning lens 615 form a scanning optical system that condenses light beams and functions as an fθ lens. The scanning optical system causes each of the light beams to be converged on the surface of the photosensitive drum 614, which is the surface to be scanned, and to scan the surface at a substantially constant velocity in a direction parallel to the rotation axis of the photosensitive drum 614. Each of the light beams emitted from the LD 1-1 and 1-2 are turned on and off according to image signals so that an image is written on the surface of the photosensitive drum 614 according to the image signals.

Figure 20:
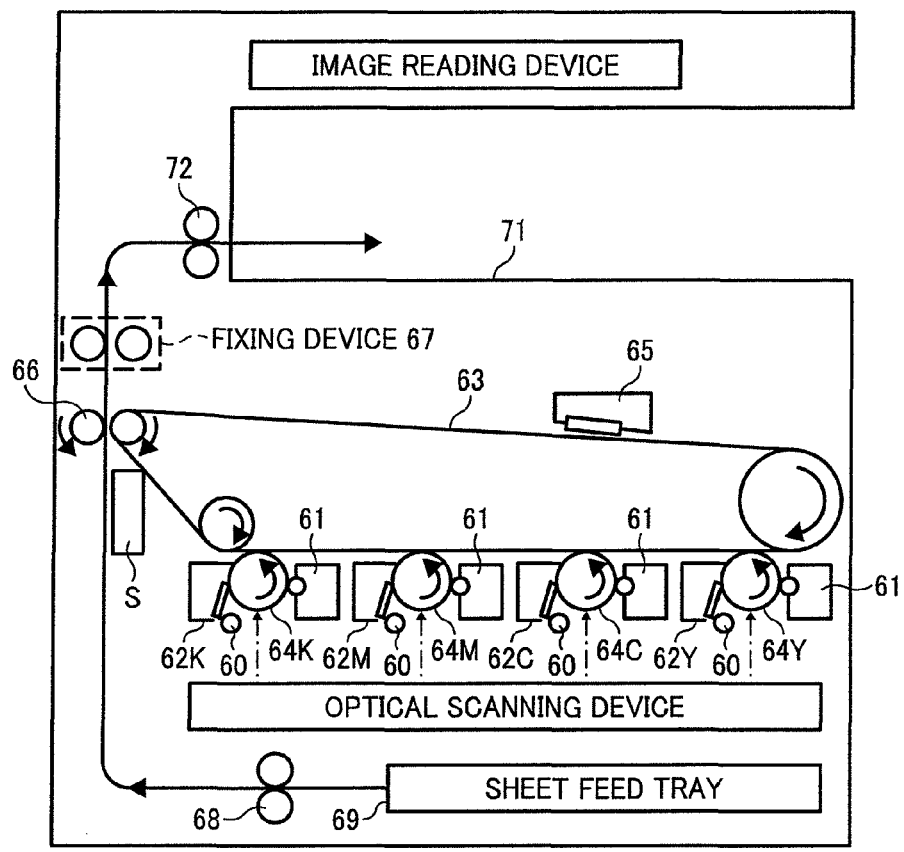
FIG. 20 is a schematic side cross-sectional view of an image forming apparatus according to a fifth embodiment of the present invention.

FIG. 20 is a schematic side cross-sectional view of an image forming apparatus according to a fifth embodiment of the present invention.

The image forming apparatus includes an image reading device, an optical scanning device, electrifying devices 60Y, 60M, 60C, and 60K (hereinafter, "electrifying device 60"), developing devices 61Y, 61M, 61C, and 61K (hereinafter, "developing device 61"), drum cleaning devices 62Y, 62M, 62C, and 62K, an intermediate transfer belt 63, photosensitive drums 64Y, 64M, 64C, and 64K, a transfer-belt cleaning device 65, a pair of transfer rollers 66, a fixing device 67, a pair of sheet feed rollers 68, a sheet feed tray 69, a sheet delivery tray 71, a pair of sheet delivery rollers 72, and an optical sensor S. Image forming is performed by using four color developing agents of yellow (Y), magenta (M), cyan (C), and black (K).

Each of the photosensitive drums 64Y, 64M, 64C, and 64K (hereinafter, "photosensitive drum 64") is a drum-shaped image carrier for a corresponding one of the developing colors. The photosensitive drums 64 are of the same diameter and arranged at regular intervals. Each of the photosensitive drums 64 is pressed against the intermediate transfer belt 63. The electrifying device 60, the developing device 61, the intermediate transfer belt 63, a drum cleaning device 62, and a neutralizing device (not shown) are arranged around the photosensitive drum 64 in this order along the rotating direction of the photosensitive drum 64.

The laser beams emitted from the optical scanning device for use in image writing strike the photosensitive drum 64 in an area between the electrifying device 60 and the developing device 61. Each of the electrifying devices 60Y, 60M, 60C, and 60K is roller-shaped and arranged at a distance from a corresponding one of the photosensitive drums 64. The electrifying device 60 electrostatically charges the surface of the photosensitive drum 64. The laser beam for use in image writing strikes the surface of the photosensitive drum 64 that has been electrostatically charged by the electrifying device 60, thereby forming an electrostatic latent image of the corresponding color on the surface of the photosensitive drum 64. Each of the developing devices 61Y, 61M, 61C, and 61K is arranged such that a developing roller of the developing device 61 is in contact with a corresponding one of the photosensitive drums 64. The developing device 61 contains toner (developing agent) of the corresponding color and supplies the toner to the photosensitive drum 64 to develop the electrostatic latent image formed on the photosensitive drum 64 into a toner image. Each of the drum cleaning devices 62Y, 62M, 62C, and 62K (hereinafter, "drum cleaning device 62") is arranged such that a blade (cleaning blade) of the drum cleaning device 62 is in contact with a corresponding one of the photosensitive drums 64. The drum cleaning device 62 removes and collects residual toner, paper powder, and the like from the surface of the photosensitive drum 64 after a toner image has been transferred onto the intermediate transfer belt 63, thereby cleaning the surface of the photosensitive drum 64.

The neutralizing device (not shown) is arranged between the drum cleaning device 62 and the electrifying device 60. The neutralizing device eliminates electrostatic charges from the surface of the photosensitive drum 64. The intermediate transfer belt 63 is an endless belt onto which the toner images formed on the photosensitive drums 64 are sequentially transferred in a superimposing manner. The toner images of the developing colors are sequentially superimposed in this manner, thereby forming a multi-color image on the intermediate transfer belt 63. The optical sensor S is arranged at a distance from the intermediate transfer belt 63. The optical sensor S detects a test toner pattern that is formed for maintenance purpose of the image forming apparatus. The transfer-belt cleaning device 65 is arranged such that a blade (cleaning blade) of the transfer-belt cleaning device 65 is in contact with the intermediate transfer belt 63. The transfer-belt cleaning device 65 removes and collects residual toner, paper powder, and the like from the surface of the intermediate transfer belt 63 after toner images have been transferred onto a recording medium, thereby cleaning the surface of the intermediate transfer belt 63.

The transfer rollers 66 transfer the color image formed on the intermediate transfer belt 63 onto the recording medium fed from the sheet feed tray 69 at a transfer position. The fixing device 67 thermally fixes the color image onto the recording medium. The sheet feed rollers 68 feed the recording medium to the transfer position. The sheet feed tray 69 contains recording media on a size-by-size basis (for clarity, only a single tray is illustrated in FIG. 20). The sheet delivery rollers 72 deliver the recording medium, onto which the color image has been thermally fixed, out of the image forming apparatus. The sheet delivery tray 71 receives the delivered recording medium thereon. All the photoconductive drums 64 rotate in the same direction. The intermediate transfer belt 63 rotates in the opposite direction from that of the photosensitive drums 64. The transfer rollers 66 includes a drive roller and a driven roller. The drive roller of the transfer rollers 66 rotates in the opposite direction from that of the intermediate transfer belt 63 (the same direction with that of the photosensitive drums 64). In FIG. 20, the photosensitive drums 64 and the drive roller of the transfer rollers 66 rotate counterclockwise while the intermediate transfer belt 63 rotates clockwise.

Figure 21:
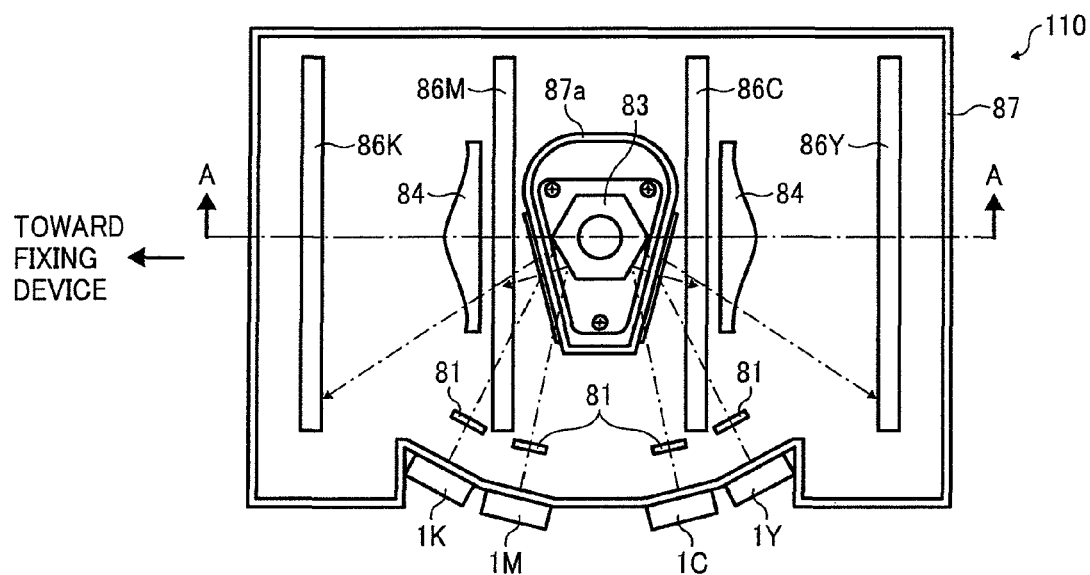
FIG. 21 is a schematic diagram of an optical scanning device according to a sixth embodiment of the present invention.

FIG. 21 is a schematic diagram of an optical scanning device 110 according to a sixth embodiment.

Figure 22:
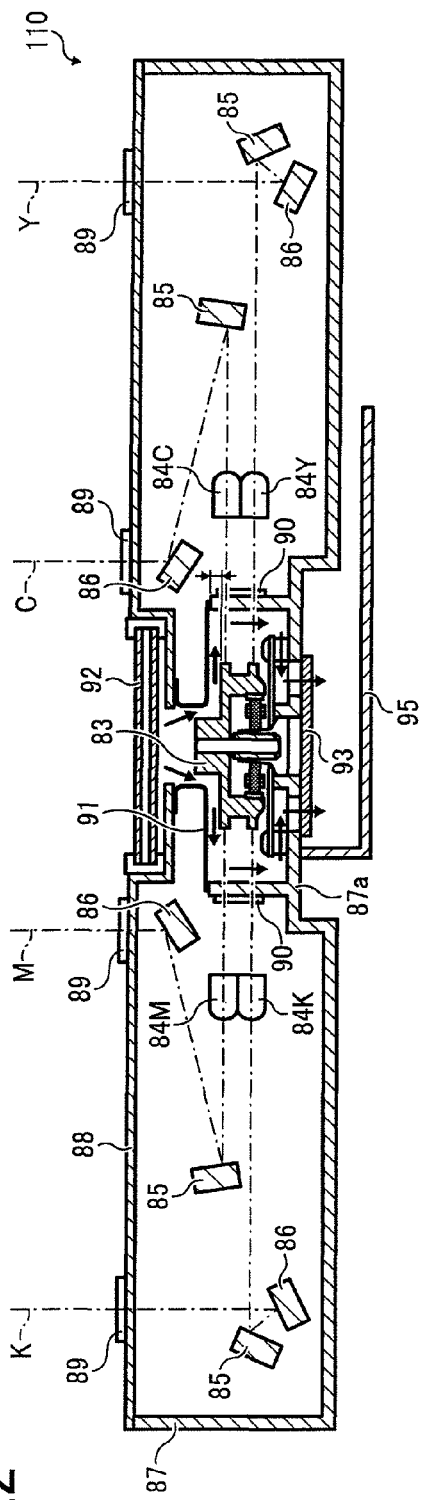
FIG. 22 is a cross-sectional view taken along a line A-A of FIG. 21.

FIG. 22 is a cross-sectional view taken along a line A-A of FIG. 21.

The optical scanning device 110 includes light source devices 1K, 1M, 1C, and 1Y, cylindrical lenses 81, a polygon mirror 83, scanning lenses 84, second reflectors 86K, 86M, 86C, and 86Y, an optical housing 87, and a partition wall 87a. The polygon mirror 83 includes mirror surfaces 83a and 83b and an axial end surface 83c.

The optical scanning device 110 also includes first reflectors 85K, 85M, 85C, and 85Y, a lid 88, dust-proof glasses 89, noise-proof glasses 90, an airflow guiding member 91, a dust-proof inlet filter 92, dust-proof outlet filters 93, a printed circuit board 94, and a guide plate 95.

Reference symbols Y, M, C, and K of the first reflectors 85K, 85M, 85C, and 85Y and the second reflectors 86K, 86M, 86C, and 86Y are omitted from FIG. 22 for clarity.

Figure 23:
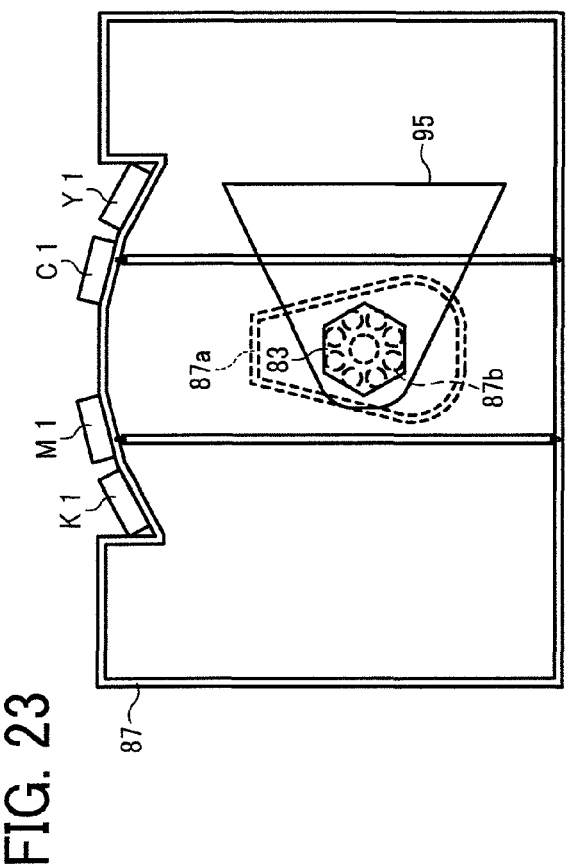
FIG. 23 is a schematic bottom view of an optical housing in the optical scanning device depicted in FIG. 21.
Figure 24:
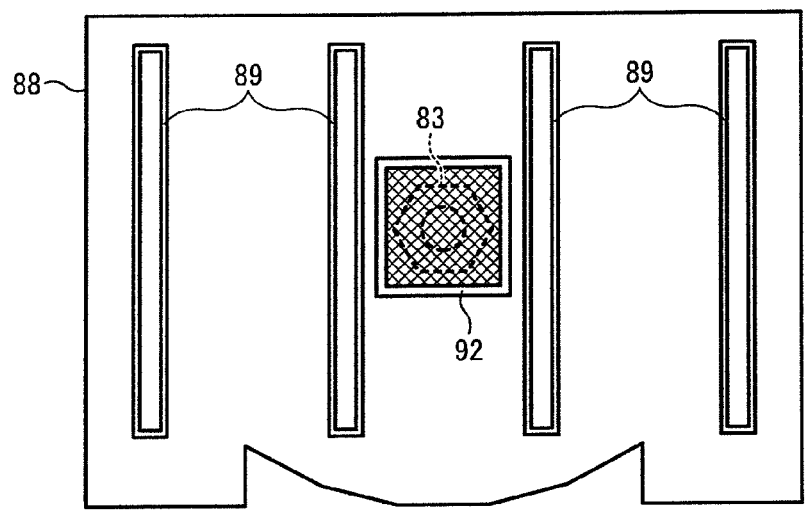
FIG. 24 is a schematic top view of a lid on the top surface of the optical housing depicted in FIG. 23.
Figure 25:
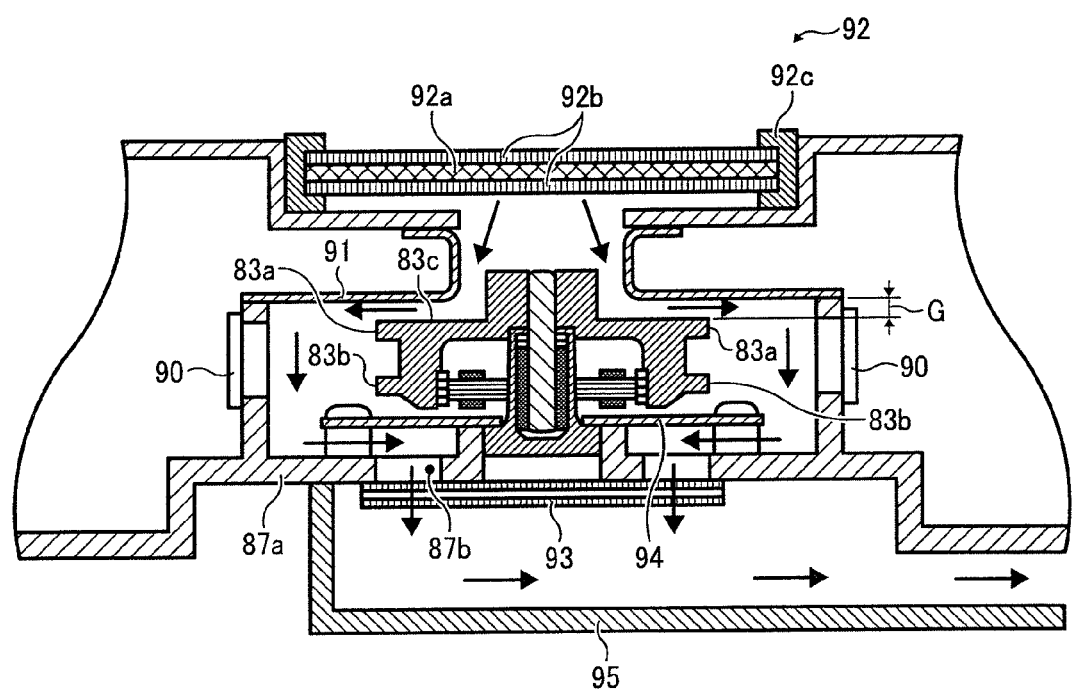
FIG. 25 is a schematic enlarged view of a portion of FIG. 22.

FIG. 23 is a schematic bottom view of the optical housing 87; FIG. 24 is a schematic top view of the lid 88 on the top surface of the optical housing 87; and FIG. 25 is a schematic enlarged view of a portion of FIG. 22.

Each of the light source devices 1Y, 1M, 1C, and 1K includes a semiconductor laser (not shown), a coupling lens (not shown), and an aperture (not shown). The light source devices 1Y, 1M, 1C, and 1K are arranged clockwise in this order in FIG. 21. Light beams emitted from the light source devices 1Y, 1M, 1C, and 1K are converted into more parallel light by the coupling lenses and shaped into a predetermined size by the apertures. The light beams are then converged by the cylindrical lenses 81 to form line images on mirror surfaces of the polygon mirror 83 at positions near reflection points. In the sixth embodiment, a height of light sources of the light source devices 1Y and 1K and a height of light sources of the light source devices 1C and 1M differ from each other. Light beams emitted from the light source devices 1C and 1M strike the mirror surface 83a of the polygon mirror 83 (see FIG. 25) while light beams emitted from the light source devices 1Y and 1K strike the mirror surface 83b. The polygon mirror 83 rotates clockwise in FIG. 21 at a constant angular velocity to deflect the incident light beams. The four light beams deflected by the polygon mirror 83 pass through scanning lenses 84Y, 84M, 84C, and 84K, respectively. The light beams are then reflected by the first reflectors 85Y, 85M, 85C, and 85K and the second reflectors 86Y, 86M, 86C, and 86K to strike the surface of the photosensitive drums 64.

Each of the scanning lenses 84Y, 84M, 84C, and 84K, each of which is a single lens, performs both the light condensing function of the first scanning lens 613 and the light condensing function of the second scanning lens 615 depicted in FIG. 19.

As depicted in FIGS. 20 and 21, the fixing device 67 which liberates the highest heat in the image forming apparatus is arranged toward the components for K and M and away from the components for C and Y.

Features of the present invention will be described below.

Referring to FIG. 22 or FIG. 25, the lid 88 is fixed to the optical housing 87. The dust-proof glasses 89 are attached to light exit portions of the lid 88, through which the laser beams for K, M, C, and Y exit from the optical housing 87, to prevent dusts and the like from entering inside the optical housing 87.

The partition wall 87a is arranged around the polygon mirror 83, thereby forming a polygon mirror chamber. The noise-proof glass 90 is attached to the partition wall 87a on sides from and to which laser beams enter and exit the polygon mirror chamber.

The airflow guiding member 91 is configured to guide outside air into the optical housing 87 and to prevent induced air from circulating over the mirror surfaces of the polygon mirror 83 and arranged above the polygon mirror 83. The airflow guiding member 91 induces outside air to the periphery of the polygon mirror 83 by utilizing a negative pressure that is built over the axial end surface 83c of the polygon mirror 83 by rotation of the polygon mirror 83. The airflow guiding member 91 includes a first surface arranged toward the outside-air inlet and a second surface that is in contact with and fixed to the partition wall 87a of the polygon mirror 83. The second surface that faces the polygon mirror 83 is a substantially annulus flat surface with a center hole therein. The airflow guiding member 91 extends to the partition wall 87a so as to form a portion of a lid of the polygon mirror chamber.

The airflow guiding member 91 prevents air from circulating over the polygon mirror 83 and supplies filtered air to the periphery of the polygon mirror 83 so that an air curtain is formed with airflow, whereby the mirror surfaces of the polygon mirror 83 are prevented from being hazed and becoming dirty. The airflow guiding member 91 preferably extends to reach or farther than the circumference of the incircle of the polygon of the polygon mirror 83 to enhance the effect of inducing outside air and prevent air from circulating over the polygon mirror 83. The airflow guiding member 91 further preferably extends farther than the circumference of the circumcircle of the polygon.

The gap G between the second surface of the airflow guiding member 91 and the polygon mirror 83 is preferably in a range from 1 to 5 millimeters. The smaller the gap G, the larger the effect of inducing outside air; however, the gap G is preferably set to an appropriate length so that loud noise is not produced by rotation of the polygon mirror 83.

The dust-proof inlet filter 92 is arranged above the airflow guiding member 91.

The dust-proof inlet filter 92 is formed by laminating sheet-type electrostatic filters 92*a*. The sheet-type electrostatic filters 92*a* are retained by structural members 92*b* and 92*c*.

As depicted in FIG. 22, FIG. 23, or FIG. 25, air vents 87*b* that are in communication with the outside of the optical housing 87 are radially arranged about the rotation axis of the polygon mirror 83.

The printed circuit board 94 is a metal-based printed circuit board on which a drive circuit component (not shown) for the motor is contained.

The dust-proof outlet filters 93 are arranged at the air vents 87*b*. As in the case of the dust-proof inlet filter 92, each of the dust-proof outlet filters 93 is formed by laminating the sheet-type electrostatic filters 92*a*. The dust-proof outlet filters 93 prevent dusts and contaminants from entering the optical housing 87 through the air vents 87*b*. The dust-proof outlet filters 93 also function as a minimum filter that minimizes a decrease in cooling efficiency due to pressure loss of the dust-proof outlet filters 93. Because air flows in one direction during rotation of the polygon mirror 83, a dust-proof filter that is relatively low in dust-proof efficiency can be used as the dust-proof outlet filters 93. The longer a dust-proof filter is used, the more the pressure loss of the filter generally becomes. Accordingly, the pressure loss of the dust-proof outlet filters 93 that is not used yet is preferably smaller than that of the dust-proof inlet filter 92 that is not used yet so as not to lower the total cooling effect of the apparatus.

The guide plate 95 that guides heated and discharged air away from the fixing device 67 is positioned near the air vents 87*b*.

The arrows in FIG. 22 and FIG. 25 schematically indicate airflows produced by rotation of the polygon mirror 83. When the polygon mirror 83 is rotated, air is pushed out by the mirror surfaces of the polygon mirror 83, thereby forming a negative pressure. Accordingly, air flows into the optical housing 87 from above and below the polygon mirror 83 under suction of the negative pressure. The negative pressure is sequentially transmitted from above the polygon mirror 83 to the inside the airflow guiding member 91, or the air inducing path, thereby inducing outside air into the polygon mirror chamber. At this time, the outside air is caused to as through the dust-proof inlet filter 92 before entering the air inducing path. Because contaminants are adsorbed by the dust-proof inlet filter 92, filtered air is supplied to the periphery of the polygon mirror 83.

The outside air induced into the polygon mirror chamber by the airflow guiding member 91 absorbs heat liberated from the polygon mirror 83, the motor unit, and the printed circuit board 94, on which the drive circuit is contained, that are arranged in the flowing path and then flows around to a backside of the printed circuit board 94. Thereafter, the heated air is discharged out of the optical housing 87. This flow path is appropriate for cooling the backside of the printed circuit board 94. The thus-discharged air whose temperature is relatively high is guided by the guide plate 95 to flow away from the fixing device 67, thereby increasing the temperature of a portion inside the optical housing 87 where the temperature is relatively low.

In this manner, in the sixth embodiment, the air heated under application of heat from the motor unit and a bearing produced by rotation of the polygon mirror 83 and frictional heat between the air and the polygon mirror 83 itself is discharged out of the optical housing 87. This in turn induces outside air whose temperature is lower than that of the discharged air to the periphery of the polygon mirror 83. This induction of the outside air not only increases the effect of cooling the polygon mirror 83, which is the heat source, but also reduces an amount of heat transmitted to optical elements, such as the condensing lenses, arranged in the optical housing 87. This reduces an amount of temperature deviation in the optical housing 87 and the optical elements. As a result, an amount of beam spot displacement resulting from partial thermal deformation in the optical scanning device 110 and a positional change of optical components of the optical scanning device 110 is reduced, whereby the degree of degradation in image quality, such as misregistration of images and colors, is reduced.

By employing a filter whose pressure loss is lower than that of the dust-proof inlet filter 92 as the dust-proof outlet filters 93, a decrease in cooling efficiency can be prevented.

Because the printed circuit board 94 for the motor that drives the polygon mirror 83 is arranged in the cooling flowing path, the printed circuit board 94 is utilized as a heat radiating plate. This increases the cooling effect.

By guiding air that is heated under application of heat produced by rotation of the polygon mirror 83 and then discharged to flow away from the fixing device 67, an amount of temperature deviation among the components for Y and C and the components for M and K in the optical scanning device 110 can be reduced.

Figure 26:
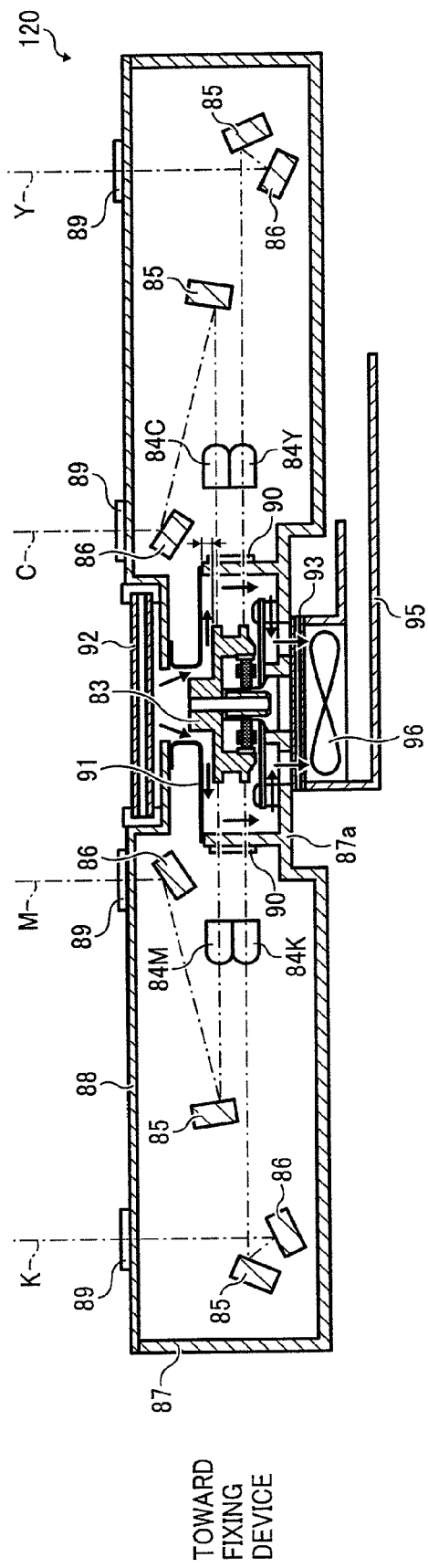
FIG. 26 is a schematic diagram illustrating an optical scanning device according a seventh embodiment of the present invention.

FIG. 26 is a schematic diagram of an optical scanning device 120 according to a seventh embodiment of the present invention.

Figure 27:
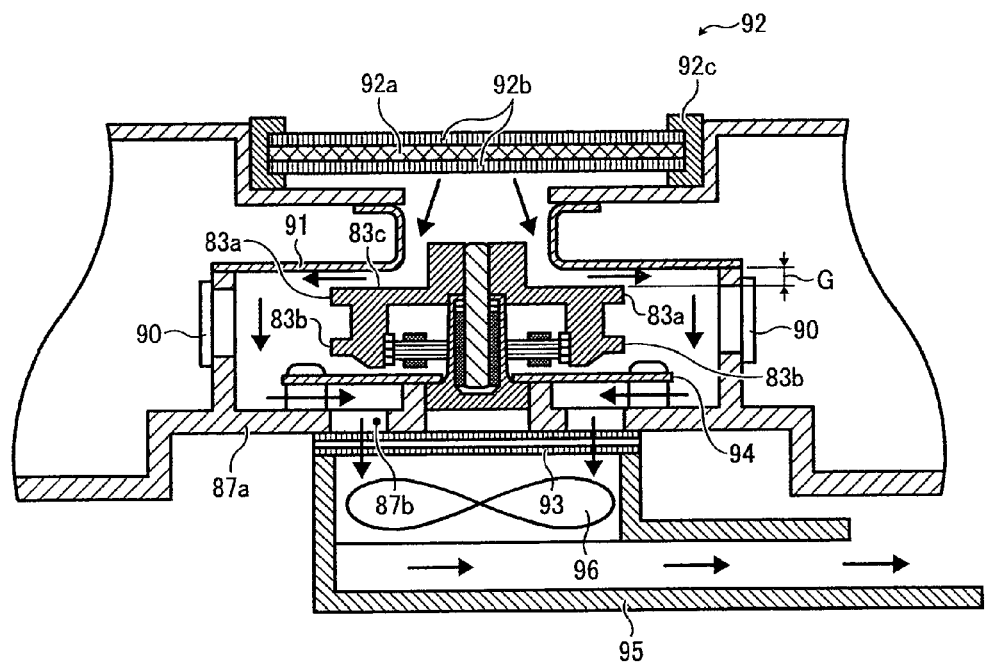
FIG. 27 is a schematic enlarged view of relevant parts of the optical scanning device, depicted in FIG. 26.
Figure 28:
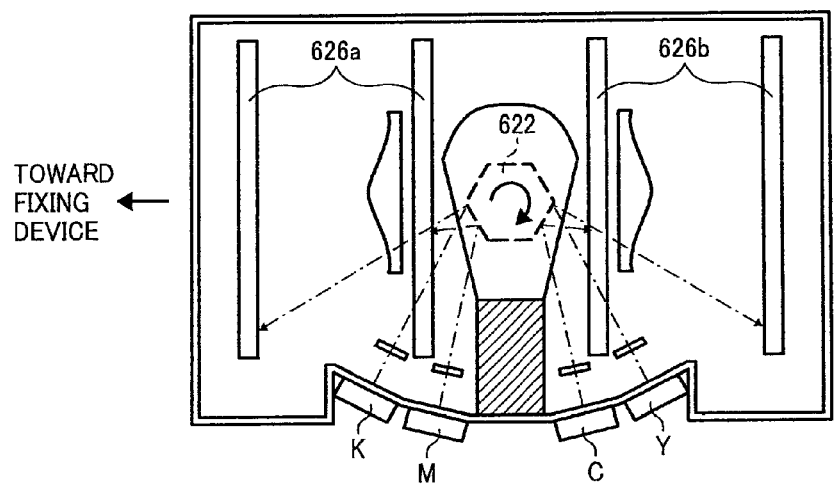
FIG. 28 is a schematic top view of an optical scanning device of another conventional structure.

FIG. 27 is a schematic enlarged view of relevant parts of the optical scanning device 120.

Reference symbols Y, M, C, and K of the first reflectors 85K, 85M, 85C, and 85Y and the second reflectors 86K, 86M, 86C, and 86Y are omitted from FIG. 26 for clarity.

In the seventh embodiment, an exhaust air duct extends from the air vents 87*b*. The exhaust air duct is positioned between the optical housing 87 and components surrounding the optical housing 87 at a position where the temperature is relatively low and extends away from the fixing device 67. By arranging the exhaust air duct away from the fixing device 67 w, the amount of temperature deviation in the optical scanning device 120 during operation of the optical scanning device 120 is reduced.

A motor fan 96 for use in exhausting air is arranged in the exhaust air duct. Because the structure of the optical scanning device 120 is similar to that of the optical scanning device 110 described above except for the exhaust air duct and the motor fan 96, repeated descriptions are omitted. The motor fan 96 discharges air out of the polygon mirror chamber to provide an aid of the air inducing effect of the airflow guiding member 91 and is arranged in a flowing path of a cooling airflow that is originally produced. Accordingly, a compact, small-power consumption motor fan can be employed as the motor fan 96.

In the seventh embodiment, it is preferable to arrange a detecting unit (not shown) that outputs a signal indicative of a cooling condition so that an output power of the motor fan 96 is controlled based on the signal output from the detecting unit.

The detecting unit can be a temperature sensor arranged on any one of a printed circuit board for a motor that drives the motor fan 96 or the printed circuit board 94 for the motor that drives the polygon mirror 83. When the output power of the motor fan 96 is configured to be controllable by changing the number of revolutions of the motor fan 96, it is possible to maintain the cooling effect constant by changing the output power of the motor fan 96 so as to compensate for a decrease in the air inducing effect, or the cooling effect, caused by clogging of the dust-proof inlet filter 92 and/or the dust-proof outlet filters 93 due to long-time usage of the image forming apparatus.

A thermistor is preferably used as the temperature sensor. A thermistor is a semiconductor made of materials whose resistance varies as a function of temperature. Accordingly, a decrease in the cooling capacity can be detected by using the thermistor. Because thermistors are relatively less expensive and compact, it is easy to contain a thermistor on the printed circuit board 94 for the motor that drives the polygon mirror 83.

Output signals of the temperature sensor can also be used to determine when the dust-proof inlet filter 92 and/or the dust-proof outlet filters 93 needs replacing. Specifically, the temperature sensor can be used as a detection unit for notification that the filter has been clogged and needs replacing. Such notification can be issued when a detected value of the temperature sensor drops below a predetermined value.

In this manner, in the optical scanning device 120 according to the seventh embodiment, the motor fan 96 aids the induction of outside air into the polygon mirror chamber. Accordingly, even when a small diameter of the circumcircle of the polygon of the polygon mirror 83 inhibits induction of a sufficient amount of outside air, it is possible to cool heat sources in the optical scanning device 120 efficiently. Pressure loss of a dust-proof filter is likely to decrease as the dust-proof capacity of the filter increases. However, even when a dust-proof filter with a relatively high dust-proof capacity is employed to ensure dust-proof effect and therefore the air inducing effect is lowered by the dust-proof filter, the heat sources in the optical scanning device 120 can be cooled efficiently by the aid of inducing the outside-air to the polygon mirror chamber.

It is also possible to maintain the cooling effect constant by changing the output power of the motor fan 96 so as to compensate for a decrease in the air inducing effect and the cooling effect caused by clogging of the dust-proof inlet filter 92 and/or the dust-proof outlet filters 93 due to long-time usage of the image forming apparatus. A decrease in cooling capacity caused by clogging of the dust-proof filter can be detected by using the temperature sensor that is easily contained on the printed circuit board 94 and relatively less expensive.

In the sixth and seventh embodiments described above, the dust-proof inlet filter 92 and the dust-proof outlet filters 93 are arranged near the polygon mirror chamber. Alternatively, it is possible to arrange sound-reducing ducts at both the inlet side and the outlet side and arranging a dust-proof filter in each of the ducts.

The noise-proof glasses 90 are arranged on the polygon mirror chamber. However, it is not necessarily requisite to include the noise-proof glass 90, and any structure can be employed so long as the structure produces airflow with filtered outside air and prevents noise production and haze on mirror surfaces of the polygon mirror 83. For example, an elongated hole can be defined in the partition wall 87a of the polygon mirror chamber rather than arranging the noise-proof glasses 90.

According to an aspect of the present invention, it is possible to efficiently induce outside air to space around a polygon mirror so that an amount of induced outside air is increased, whereby cooling effect is increased while preventing mirror surfaces of the polygon mirror from being hazed and becoming dirty.

A negative pressure is built between the polygon mirror and an airflow guiding member, which induces outside air into an optical housing. After absorbing heat liberated from heat sources, the induced air is immediately discharged out of the optical housing. Because the polygon mirror and a motor for the polygon mirror, which are the heat sources, are efficiently cooled in this manner, heat leakage to a light source and a scanning lens is prevented. Accordingly, beam spot displacement that can occur when a fixed position of an optical component is changed by the heat is reduced. Simultaneously, dusts and contaminants contained in the outside air are removed by a dust-proof filter. Because filtered air is supplied to the periphery of the polygon mirror, an amount of haze on the mirror surfaces of the polygon mirror is reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device that includes an optical housing in which a polygon mirror that is rotated by a driving force from a motor is accommodated and an air inlet that includes a filter, the optical scanning device comprising:
    an airflow guiding member that is arranged at a position opposite to a surface of the polygon mirror on the air inlet side, for preventing an air circulation around the polygon mirror; and
    an air inducing path that includes
        a first flowing path including a first end that is linked to the air inlet and a second end that is arranged close to a mirror surface of the polygon mirror, and
        a second flowing path that is formed with a surface of the airflow guiding member on an opposite side of the air inlet and a top surface of the polygon mirror.

2. The optical scanning device according to claim 1, wherein a surface of the airflow guiding member facing the polygon mirror is a substantially annular plane.

3. The optical scanning device according to claim 2, wherein an outer diameter of the substantially annular plane is larger than a diameter of an inscribed circle of a polygon that is formed with mirror surfaces of the polygon mirror.

4. The optical scanning device according to claim 1, wherein the first flowing path has a substantially cylindrical shape.

5. The optical scanning device according to claim 1, wherein the first flowing path has a substantially conical shape that expands from the air inlet side toward the polygon mirror.

6. The optical scanning device according to claim 1, wherein
    the first flowing path includes a suction duct that is linked to the air inlet, and
    the suction duct is formed with a long flowing path and a short flowing path branched and merged.

7. The optical scanning device according to claim 1, wherein the first flowing path includes a suction duct that includes a first opening that is linked to the air inlet and a second opening that is open to outside air, and the suction duct is formed with a long flowing path and a short flowing path branched and merged.

8. The optical scanning device according to claim 6, wherein the long flowing path and the short flowing path are configured to substantially satisfy $$a-b=(c \times 60)/(2 \times N \times M)$$

where a is length of the long flowing path in millimeters, b is length of the short flowing path in millimeters, N is number of revolutions per minute of the motor, M is number of the mirror surfaces of the polygon mirror, and c is acoustic velocity in air in millimeters per second.

9. The optical scanning device according to claim 6, wherein at least a portion of the flowing paths of the suction duct is made of either one of a damping material and a sound-absorbing material.

10. The optical scanning device according to claim 6, wherein at least a portion of the flowing paths of the suction duct is made of an adsorbent capable of adsorbing a dust.

11. The optical scanning device according to claim 6, wherein the flowing paths of the suction duct include at least one bent portion.

12. The optical scanning device according to claim 6, wherein the flowing paths of the suction duct include at least one tapered portion.

13. The optical scanning device according to claim 1, further comprising a partition wall around the polygon mirror in the optical housing to form a polygon mirror chamber, wherein an air outlet that communicates with outside of the optical housing is provided on either one of a bottom surface of the polygon mirror chamber and a partition wall on a side other than an optical scanning side.

14. The optical scanning device according to claim 13, further comprising a dust-proof outlet filter arranged on an air exhaust path to the air outlet, wherein before an operation of the optical scanning device, pressure loss of the dust-proof outlet filter is lower than pressure loss of the filter included in the air inlet.

15. The optical scanning device according to claim 13, wherein the motor is integrated with a metal-based printed circuit board, the printed circuit board is fixed to the polygon mirror chamber, and the air outlet is arranged behind the metal printed circuit board.

16. An image forming apparatus that forms an image on a recording medium by forming a latent image on a photosensitive medium by an optical scanning using an optical scanning device and developing the latent image with toner, wherein the optical scanning device includes an optical housing in which a polygon mirror that is rotated by a driving force from a motor is accommodated, an air inlet that includes a filter, an airflow guiding member that is arranged at a position opposite to a surface of the polygon mirror on the air inlet side, for preventing an air circulation around the polygon mirror, and an air inducing path that includes a first flowing path including a first end that is linked to the air inlet and a second end that is arranged close to a mirror surface of the polygon mirror, and a second flowing path that is formed with a surface of the airflow guiding member on an opposite side of the air inlet and a top surface of the polygon mirror.

17. The image forming apparatus according to claim 16, wherein the optical scanning device further includes an air outlet that communicates with outside of the optical housing, and a fan motor fan is provided on an air exhaust path to the air outlet.

18. The image forming apparatus according to claim 16, further comprising:

a detecting unit that detects cooling efficiency of the optical scanning device; and a control unit that performs an output control of the fan motor based on an output from the detecting unit.

19. The image forming apparatus according to claim 18, wherein the detecting unit is a temperature sensor provided on a printed circuit board for either one of the fan motor and the motor that drives the polygon mirror.

20. The image forming apparatus according to claims 16, further comprising a fixing unit that fixes a toner image obtained by developing the latent image on the recording medium, wherein the fixing unit is arranged at an isolated position from the optical scanning device, and an air exhaust path is arranged between the optical housing and components surrounding the optical housing in a direction away from the fixing unit.

* * * * *